(12) United States Patent
Yuasa et al.

(10) Patent No.: US 10,949,159 B2
(45) Date of Patent: Mar. 16, 2021

(54) INFORMATION PROCESSING APPARATUS

(71) Applicant: NTT DOCOMO, INC., Tokyo (JP)

(72) Inventors: Tomotaka Yuasa, Tokyo (JP); Motoshi Tamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 35 days.

(21) Appl. No.: 16/464,944

(22) PCT Filed: Oct. 30, 2018

(86) PCT No.: PCT/JP2018/040375
§ 371 (c)(1),
(2) Date: May 29, 2019

(87) PCT Pub. No.: WO2019/150675
PCT Pub. Date: Aug. 8, 2019

(65) Prior Publication Data
US 2020/0341714 A1    Oct. 29, 2020

(30) Foreign Application Priority Data
Feb. 2, 2018  (JP) .............................. JP2018-017262

(51) Int. Cl.
*G06F 3/14* (2006.01)
*H04N 5/262* (2006.01)
(Continued)

(52) U.S. Cl.
CPC ........... *G06F 3/1454* (2013.01); *H04N 5/247* (2013.01); *H04N 5/2628* (2013.01)

(58) Field of Classification Search
CPC ............ G06F 3/04815; H04N 21/2668; H04N 21/4728; H04N 21/44; H04N 21/44016;
(Continued)

(56) References Cited

U.S. PATENT DOCUMENTS 10,534,434 B2 * 1/2020 Yoo ...................... G06F 3/0484
                                                       715/763
10,827,230 B2 * 11/2020 Shimura ............ H04N 21/6587
                                                       725/116
(Continued)

FOREIGN PATENT DOCUMENTS

EP        3190503 A1    7/2017
EP        3264222 A1    1/2018
(Continued)

OTHER PUBLICATIONS

Extended European Search Report for European Patent Application No. 18880035.3-1208/3547691 PCT/JP2018040375, dated Oct. 10, 2019, 9 pages.
(Continued)

*Primary Examiner* — Marly S Camargo
(74) *Attorney, Agent, or Firm* — MKG, LLC

(57) ABSTRACT

To make it easier to switch to video that is being viewed by another user, a source data acquisition unit acquires source data of content that is distributed by an apparatus. A video clipping unit clips video in a range specified by a participant's terminal out of 360-degree video indicated by the source data supplied thereto. Upon receiving a range of video specified in association with the participant's terminal, a content distribution unit clips video in the range out of 360-degree video acquired by the source data acquisition unit and distributes the clipped video to the participant's terminal. Also, upon a display switching instruction being made in association with a switching source participant's terminal, the content distribution unit distributes video that is clipped according to a range of video specified in association with a switching destination participant's terminal, to the switching source participant's terminal.

9 Claims, 9 Drawing Sheets

(51) Int. Cl.
*H04N 5/247* (2006.01)
*G06F 3/048* (2013.01)
*G06T 7/70* (2017.01)
*H04N 21/472* (2011.01)
*H04N 21/41* (2011.01)
*H04N 21/61* (2011.01)

(58) Field of Classification Search
CPC .. H04N 21/41; H04N 21/8106; H04N 21/816; H04N 21/233
USPC .......... 725/125, 41, 105; 382/164, 171, 173; 345/620, 623, 624, 633; 375/240.01; 715/723, 756, 757, 771, 706, 778, 722.72, 715/719, 716, 733; 709/203, 219
See application file for complete search history.

(56) References Cited

U.S. PATENT DOCUMENTS

| | | | |
|---|---|---|---|
| 2013/0019182 A1* | 1/2013 | Gil | G06F 3/048 715/738 |
| 2014/0152544 A1* | 6/2014 | Ohta | G06F 3/1523 345/156 |
| 2016/0035224 A1 | 2/2016 | Yang et al. | |
| 2016/0093108 A1 | 3/2016 | Mao et al. | |
| 2016/0212272 A1 | 7/2016 | Srinivasan et al. | |
| 2017/0150230 A1 | 5/2017 | Shimura et al. | |
| 2019/0075269 A1 | 3/2019 | Nashida | |
| 2020/0106708 A1* | 4/2020 | Sleevi | H04L 47/125 370/235 |

FOREIGN PATENT DOCUMENTS

| | | |
|---|---|---|
| JP | 2017-504863 A | 2/2017 |
| WO | 2016002445 A1 | 4/2017 |
| WO | 2017159063 A1 | 1/2019 |

OTHER PUBLICATIONS

Notice of Reasons for Refusal issued in corresponding Japanese Patent Application No. 2019-530115, dated Jun. 2, 2020, 8 pages.
European Office Action issued in corresponding European Patent Application No. 18880035.3-1208, dated Jul. 16, 2020, 6 pages.

* cited by examiner

INFORMATION PROCESSING APPARATUS

TECHNICAL FIELD

The present invention relates to video distribution technology.

BACKGROUND

Japanese Patent Application No. JP2017-504863A discloses technology for integrating and presenting visual data and non-visual data acquired by an unmanned aerial vehicle, using a virtual reality terminal.

Video distributed using AR (Augmented Reality) technology, VR (Virtual Reality) technology, or the like provides an enhanced sense of being there to a viewer, compared to normal video. In addition, if a viewer can view video that is the same as video that is viewed by another viewer, these viewers can share an enhanced sense of unity, which facilitates human communication in the real world as well.

Therefore, an object of the present invention is to make it easier to switch to video that is viewed by another user.

SUMMARY OF THE INVENTION

To achieve the above-described object, the present invention provides an information processing apparatus including: an image acquisition unit that acquires a captured image; and a distribution unit that, upon receiving a range of image specified in association with a first display apparatus, clips a partial image in the range from the acquired image and distributes the clipped partial image to the first display apparatus, and upon a display switching instruction being made in association with the first display apparatus, distributes another partial image clipped in a range specified in association with a second display apparatus, to the first display apparatus.

The information processing apparatus may further include an accumulation unit that accumulates the acquired image, and the distribution unit may distribute the other partial image clipped in the past according to the range specified in association with the second display apparatus, from the accumulated image, to the first display apparatus.

The information processing apparatus may further include: a sound acquisition unit that acquires sound that reaches the second display apparatus; and a first transmission unit that transmits data that indicates a direction corresponding to the second display apparatus, and the acquired sound, to the first display apparatus, and the first display apparatus may include a speaker that outputs sound indicated by the data transmitted by the first transmission unit, as sound that comes from the direction indicated by the data, and upon an instruction being made to change an orientation of the first display apparatus to the direction indicated by the data transmitted to the first display apparatus, the distribution unit may distribute the other partial image clipped according to the range specified in association with the second display apparatus, to the first display apparatus.

The information processing apparatus may further include a second transmission unit that transmits a direction instructing image that indicates a direction corresponding to the second display apparatus, to the first display apparatus, and when an instruction is made to change an orientation of the first display apparatus to the direction indicated by the direction instructing image thus transmitted, the distribution unit may distribute the other partial image clipped according to the range specified in association with the second display apparatus, to the first display apparatus.

The information processing apparatus may further include a position acquisition unit that acquires position information indicating at least one position of one or more display apparatuses, and the distribution unit may determine another display apparatus from among the one or more display apparatuses, from which the position information indicating a position that is at a distance within a predetermined range to the first display apparatus has been acquired, as the second display apparatus to distribute the other partial image.

The information processing apparatus may further include a language acquisition unit that acquires language information indicating at least one language that is used in one or more display apparatuses, and the distribution unit may determine another display apparatus from among the one or more display apparatuses, from which the language information indicating a language that is the same as a language used in the first display apparatus has been acquired, as the second display apparatus to distribute the other partial image.

The information processing apparatus may further include a time zone acquisition unit that acquires time zone information indicating at least one standard time zone used at a position of one or more display apparatuses, and the distribution unit may determine another display apparatus from among the one or more display apparatuses, of which a standard time zone indicated by the time zone information acquired therefrom has a time difference smaller than a threshold value when compared to another standard time zone indicated by the time zone information acquired from the first display apparatus, as the second display apparatus to distribute the other partial image.

The information processing apparatus may further include a plurality of capturing apparatuses that capture images, and the distribution unit may determine another display apparatus that is displaying an image captured by a capturing apparatus that is the same as a capturing apparatus that has captured an image displayed by the first display apparatus, as the second display apparatus to distribute the other partial image.

The information processing apparatus may further include: a plurality of capturing apparatuses that capture images; and a capture position acquisition unit that acquires capture position information indicating positions of the plurality of capturing apparatuses, and when the plurality of capturing apparatuses include another capturing apparatus from which the capture position information indicating a position at a distance within a predetermined range to a capturing apparatus that has captured image displayed by the first display apparatus has been acquired, the distribution unit may determine another display apparatus that is displaying the image captured by the other capturing apparatus as the second display apparatus to distribute the other partial image.

According to the present invention, it is possible to make it easier to switch to video that is being viewed by another user.

DETAILED DESCRIPTION

Figure 1:
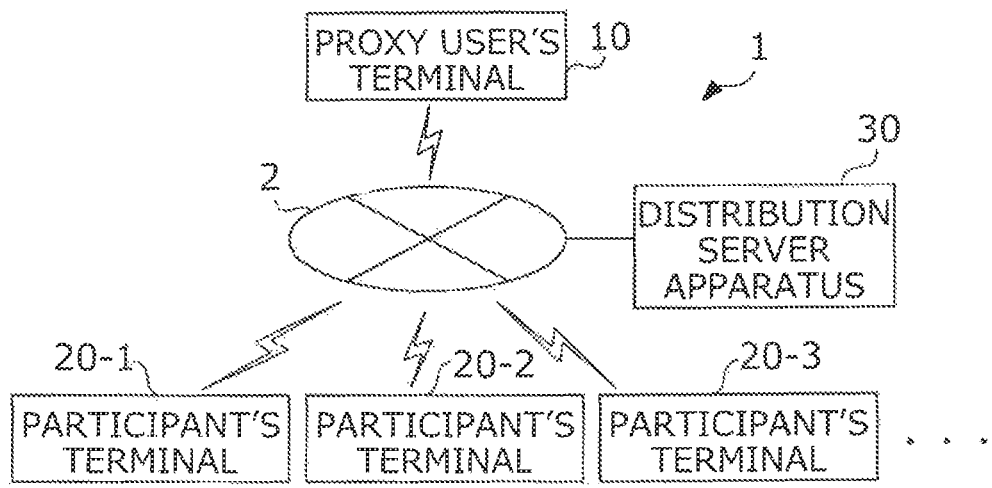
FIG. 1 is a diagram illustrating an overall configuration of a virtual travel system according to an embodiment.

FIG. 1 illustrates an overall configuration of virtual travel system 1 according to an embodiment. Virtual travel system 1 is a system for providing a virtual travel service through which users can virtually enjoy travel without actually going to a travel destination such as a tourist spot. Virtual travel system 1 is mainly used by two types of users, namely a proxy user who captures video at a travel destination, and a participant who takes part in virtual travel.

Virtual travel system 1 includes network 2, proxy user's terminal 10, participant's terminals 20-1, 20-2, 20-3, and so on (hereinafter referred to as "participant's terminals 20" when they are not distinguished from each other), and distribution server apparatus 30. Network 2 is a communication system including a mobile communication network, the Internet, and the like, and relays the exchange of data between apparatuses accessing that system. Network 2 is accessed by distribution server apparatus 30 through wired communication, and by proxy user's terminal 10 and participant's terminals 20 through wireless communication. Network 2 may be accessed through wired communication or wireless communication.

Proxy user's terminal 10 is an image capturing apparatus that is carried by a proxy user at a travel destination, and captures video at the travel destination. In the present embodiment, proxy user's terminal 10 is attached to the head of a proxy user, and captures so-called 360-degree video (also called all-direction image or omnidirectional image), which is moving images including images on the front, rear, left, right, top, and bottom side of the proxy user. Proxy user's terminal 10 also records sound using a microphone thereof, and transmits it to distribution server apparatus 30 along with captured 360-degree video.

Distribution server apparatus 30 is a distribution apparatus that distributes, to participant's terminals 20, virtual travel content including video, sound, and so on captured or recorded by proxy user's terminal 10 at a travel destination. The distribution server apparatus 30 clips and distributes a certain range of video specified from participant's terminal 20 out of captured 360-degree video. Participant's terminals 20 are output apparatuses that output content distributed by distribution server apparatus 30, and, for example, display video included in the content, and emit sound included in the content.

In the present embodiment, participant's terminal 20 is an HMD (Head Mounted Display) attached to the head of a user. Participant's terminal 20 measures the direction in which the front face of the terminal is orientated (the azimuth and the angles of elevation and depression), and specifies a range of video corresponding to the measured direction for distribution server apparatus 30. As a result, for example, if a participant faces east, video captured at the position of proxy user's terminal 10 in a direction to the east is distributed, and if a participant faces upward, video captured by the proxy user's terminal 10 in a vertically upward direction is distributed.

Figure 2:
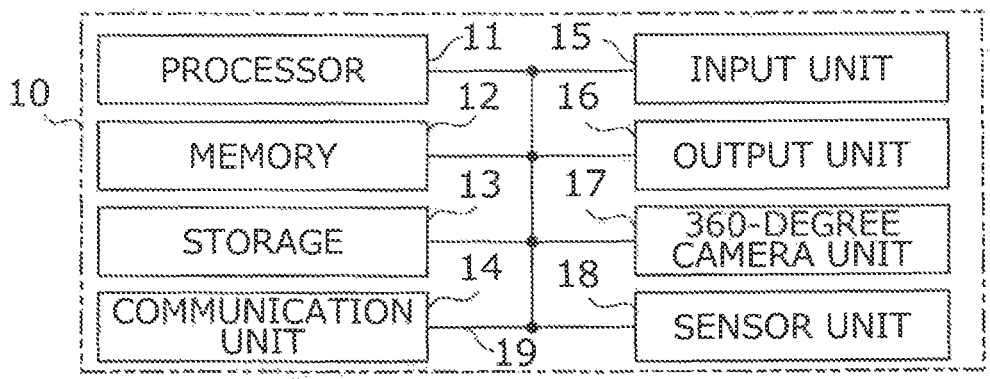
FIG. 2 is a diagram illustrating a hardware configuration of a proxy user's terminal.

FIG. 2 is a diagram illustrating a hardware configuration of proxy user's terminal 10. Proxy user's terminal 10 is a computer that includes apparatuses such as processor 11, memory 12, storage 13, communication unit 14, input unit 15, output unit 16, 360-degree camera unit 17, sensor unit 18, and bus 19. The term "apparatus" used here can be replaced with "circuit", "device", "unit", or the like. One or more of each apparatus may be included, and some apparatuses may be omitted.

Processor 11 controls the computer as a whole by running an operating system, for example. Processor 11 may be constituted by a central processing unit (CPU) including an interface with peripheral apparatuses, a control apparatus, a computation apparatus, registers, and the like. Additionally, processor 11 reads out programs (program code), software modules, data, and the like from storage 13 and/or communication unit 14 into memory 12, and then executes various types of processes in accordance therewith.

There may be one, or two or more, processors 11 that execute the various types of processes, and two or more processors 11 may execute various types of processes simultaneously or sequentially. Processor 11 may be provided as one or more chips. The programs may be transmitted from a network over an electrical communication line.

Memory 12 is a computer-readable recording medium, and may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage apparatus), or the like. Memory 12 can store the aforementioned programs (program code), software modules, data, and the like.

Storage 13 is a computer-readable recording medium, and may be constituted by at least one of an optical disk such as a CD-ROM (Compact Disc ROM), a hard disk drive, a flexible disk, a magneto-optical disk (e.g., a compact disk, a digital versatile disk, or a Blu-ray (registered trademark) disk), a smartcard, flash memory (e.g., a card, a stick, or a key drive), a Floppy (registered trademark) disk, a magnetic strip, and the like.

Storage 13 may be called an auxiliary storage apparatus. The aforementioned storage medium may be a database, a server, or another appropriate medium including memory 12 and/or storage 13, for example. Communication unit 14 is hardware for communicating between computers over a wired and/or wireless network (a transmission/reception device), and is also called a network device, a network controller, a network card, a communication module, and the like, for example.

Input unit 15 is an input device that accepts inputs from the exterior (e.g., a keyboard, a mouse, a microphone, a switch, a button, a sensor, or the like). In addition, input unit 15 includes, as an input device, a microphone that collects sound (ambient sound) generated in the vicinity of the terminal and reaching the terminal. Output unit 16 is an output device that makes outputs to the exterior (e.g., a display, a speaker, an LED lamp, or the like).

360-degree camera unit 17 is an image capturing device that captures the above-described 360-degree video. 360-degree camera unit 17 includes two or more wide angle cameras, for example, and captures 360-degree video by orientating the wide angle cameras in different directions so that all directions are within the coverage of image capturing (note that it is not necessary to cover all directions without exception, and there may be a blind spot at the proxy user's feet). Sensor unit 18 includes a sensor that measures the orientation of 360-degree camera unit 17 (a magnetic sensor or the like).

The 360-degree camera unit 17 has a front face determined in advance, and sensor unit 18 measures the azimuth of the direction in which the front face is orientated (the forward direction of the camera unit) and the angles of elevation and depression of the front face. If the proxy user moves or turns, the forward direction of the camera unit changes, and sensor unit 18 outputs measurement values indicating the orientation. These measurement values indicate, for example, which part of the captured 360-degree video is video captured in a direction to the east from the terminal, which part is video captured upward in a vertical direction from the terminal, and so on.

Sensor unit 18 may be built into 360-degree camera unit 17. The microphone of input unit 15 may also be built into 360-degree camera unit 17. The apparatuses such as processor 11 and memory 12 can access each other over bus 19, which is used for communicating information. Bus 19 may be constituted by a single bus, or may be constituted by buses that differ among the apparatuses.

Proxy user's terminal 10 and so on may be configured including hardware such as a microprocessor, a DSP (Digital Signal Processor), an ASIC (Application Specific Integrated Circuit), a PLD (Programmable Logic Device), an FPGA (Field Programmable Gate Arrays, and the like, and some or all of the function blocks may be realized by that hardware. For example, processor 11 may be provided as at least one of these types of hardware.

Figure 3:
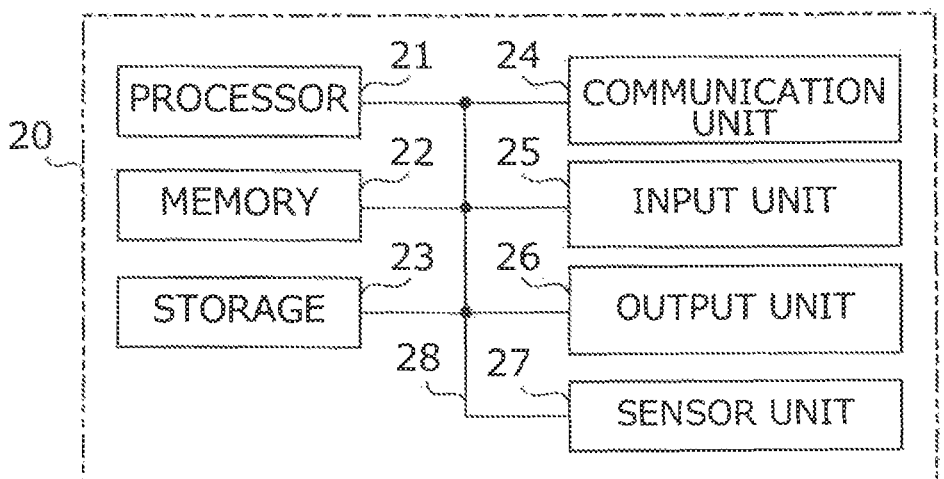
FIG. 3 is a diagram illustrating a hardware configuration of a participant's terminal.

FIG. 3 is a diagram illustrating a hardware configuration of participant's terminal 20. Participant's terminal 20 is a computer that includes apparatuses such as processor 21, memory 22, storage 23, communication unit 24, input unit 25, output unit 26, sensor unit 27, and bus 28. These apparatuses are of the same types as the apparatuses of the same names in FIG. 2 even though capabilities, specifications, or the like are different. However, they are not completely the same, and the following describes particularly important points that differ from the apparatuses in FIG. 2.

Output unit 26 includes a speaker that allows a user to discern the direction from which sound comes (so-called sound localization). A participant wearing participant's terminal 20 can discern the direction from which sound comes, e.g. the participant can hear another participant's voice from behind him/her. Sensor unit 27 includes a sensor (a magnetic sensor or the like) that measures the orientation of the front face of the terminal, and measures the azimuth of the direction in which the front face is orientated and the angles of elevation and depression of the front face.

Figure 4:
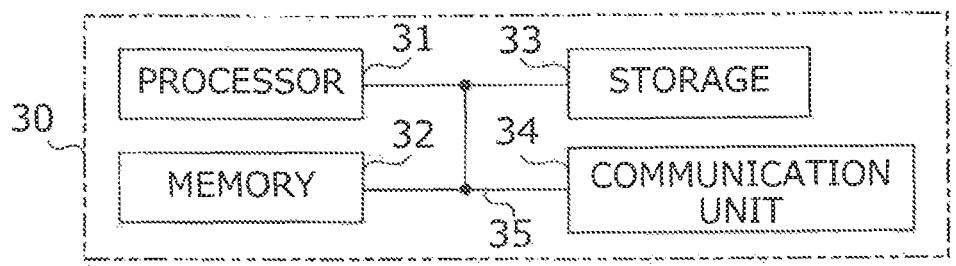
FIG. 4 is a diagram illustrating a hardware configuration of a distribution server apparatus.

FIG. 4 is a diagram illustrating a hardware configuration of distribution server apparatus 30. Distribution server apparatus 30 is a computer that includes apparatuses such as processor 31, memory 32, storage 33, communication unit 34, and bus 35. These apparatuses are of the same types as the apparatuses of the same names in FIG. 2 even though capabilities, specifications, or the like are different.

Proxy user's terminal 10, participant's terminals 20, and distribution server apparatus 30 included in virtual travel system 1 store programs provided by the system, and implement the following group of functions by the processors included in the apparatuses executing programs and controlling the various units.

Figure 5:
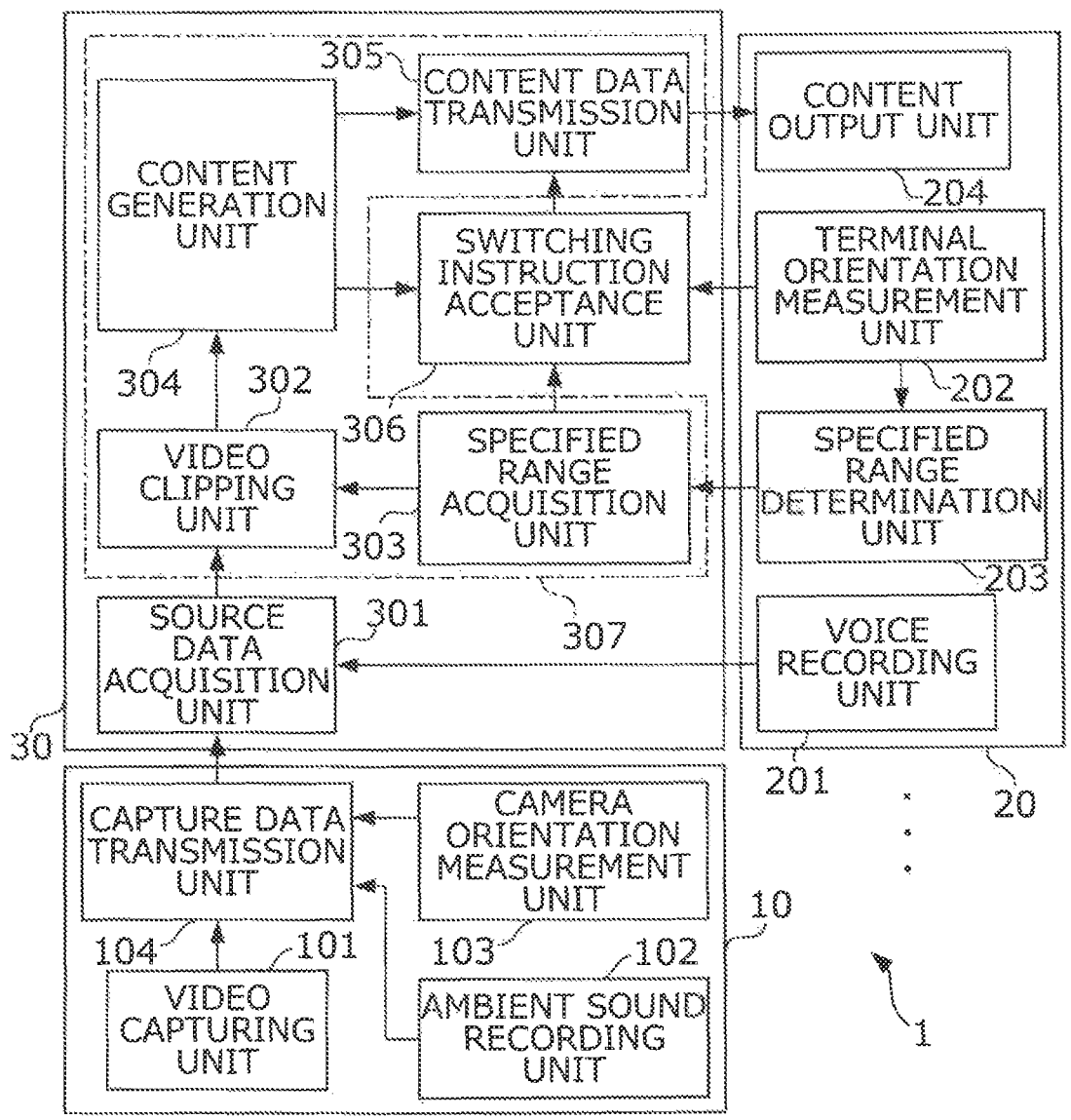
FIG. 5 is a diagram illustrating a functional configuration realized by a virtual travel system.

FIG. 5 illustrates a functional configuration realized by virtual travel system 1. Proxy user's terminal 10 includes video capturing unit 101, ambient sound recording unit 102, camera orientation measurement unit 103, and capture data transmission unit 104.

Participant's terminal 20 includes voice recording unit 201, terminal orientation measurement unit 202, specified range determination unit 203, and content output unit 204. Although FIG. 5 illustrates only one participant's terminal 20, every one of a plurality of participant's terminals 20 realizes the functional configuration illustrated in FIG. 5. Distribution server apparatus 30 includes source data acquisition unit 301, video clipping unit 302, specified range acquisition unit 303, content generation unit 304, content data transmission unit 305, and switching instruction acceptance unit 306.

In virtual travel system 1, distribution server apparatus 30 stores terminal IDs (Identifications) respectively identifying participant's terminals 20, and pieces of address information (IP (Internet Protocol) addresses or the like) used when video is distributed to those participant's terminals 20, in association with each other. Also, proxy user's terminal 10 and participant's terminals 20 store address information regarding distribution server apparatus 30, and can exchange data with distribution server apparatus 30 when necessary.

Video capturing unit 101 of proxy user's terminal 10 captures video of the proxy user's surroundings. In the present embodiment, video capturing unit 101 captures 360-degree video by controlling 360-degree camera unit 17 illustrated in FIG. 2. During a virtual travel service providing period (a period from a service start time to a service end time that have been determined), video capturing unit 101 captures 360-degree video while simultaneously supplying the captured 360-degree video to capture data transmission unit 104.

Ambient sound recording unit 102 controls the microphone provided in input unit 15 illustrated in FIG. 2 to record the above-described ambient sound (sound generated in the vicinity of the terminal and reaching the terminal). During the virtual travel service providing period, ambient sound recording unit 102 records ambient sound while simultaneously supplying the recorded ambient sound to capture data transmission unit 104.

Camera orientation measurement unit 103 controls sensor unit 18 illustrated in FIG. 2 to measure the azimuth of the direction in which the predetermined front face of 360-degree camera unit 17 is orientated and the angles of elevation and depression of the front face. The azimuth and the angles of elevation and depression are information indicating the orientation of the front face of 360-degree camera unit 17, and are hereinafter referred to as "camera orientation information". During the virtual travel service providing period, camera orientation measurement unit 103 repeatedly measures camera orientation information (the azimuth and the angles of elevation and depression) while simultaneously and repeatedly supplying the measured camera orientation information to capture data transmission unit 104.

Capture data transmission unit 104 transmits capture data, which is data regarding video captured by the terminal, to distribution server apparatus 30. Specifically, capture data transmission unit 104 generates, as capture data, data that indicates 360-degree video supplied from video capturing unit 101, ambient sound supplied from ambient sound recording unit 102, and camera orientation information supplied from camera orientation measurement unit 103, and transmits the capture data to distribution server apparatus 30.

Voice recording unit 201 of participant's terminal 20 records the voice of the participant wearing the terminal. Voice recording unit 201 transmits voice data indicating the recorded voice to distribution server apparatus 30. Source data acquisition unit 301 of distribution server apparatus 30 acquires data (source data) from which content (virtual travel content) that is to be distributed by the apparatus is generated. Source data is constituted by capture data transmitted from proxy user's terminal 10 and voice data transmitted from participant's terminal 20.

Source data acquisition unit 301 acquires capture data transmitted from proxy user's terminal 10 as the source data of content, thereby acquiring the video indicated by the capture data, i.e. video captured by proxy user's terminal 10 (360-degree video in the present embodiment). Source data acquisition unit 301 is an example of "an image acquisition unit" according to the present invention. Source data acquisition unit 301 also acquires capture data, thereby acquiring the sound indicated by the capture data, i.e. sound (ambient sound) reaching proxy user's terminal 10.

Each time source data acquisition unit 301 acquires capture data and voice data as source data of content, source data acquisition unit 301 supplies the acquired source data to video clipping unit 302. Video clipping unit 302 clips video in a range specified by participant's terminal 20 out of 360-degree video indicated by the supplied source data. A range is specified in the following manner. Terminal orientation measurement unit 202 of participant's terminal 20 measures the azimuth of the direction in which the predetermined front face of the terminal is orientated and the angles of elevation and depression of the front face as information indicating the orientation of the terminal (hereinafter referred to as "terminal orientation information").

Terminal orientation measurement unit 202 repeatedly measures terminal orientation information at predetermined time intervals, and repeatedly supplies the measured terminal orientation information to specified range determination unit 203. Specified range determination unit 203 determines a specified range that is to be specified as a range of video that is to be displayed on the terminal, based on the terminal orientation information measured by terminal orientation measurement unit 202. For example, specified range determination unit 203 determines, as a specified range, a range of video captured in a direction indicated by the supplied terminal orientation information, by a camera that has a certain angle of view (e.g. a vertical angle of 25 degrees and a horizontal angle of 45 degrees).

Figure 6:
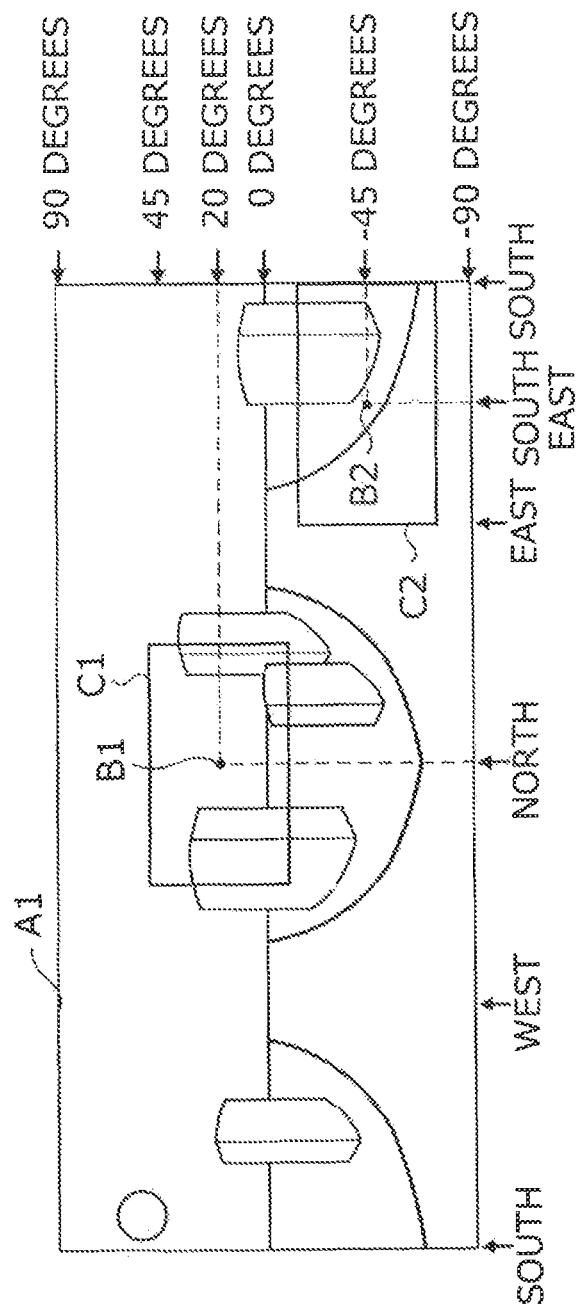
FIG. 6 is a diagram illustrating an example of a specified range.

FIG. 6 illustrates an example of a specified range. FIG. 6 illustrates 360-degree video A1 captured by video capturing unit 101. 360-degree video A1 is video captured by 360-degree camera unit 17 in a state where 360-degree camera unit 17 is orientated in the true north and the angle of tilt is 0 degrees (in a state where the forward direction of the camera is horizontal). Therefore, in 360-degree video A1, the horizon is located at the middle of the video (at 0 degrees) in the vertical direction, and the true north direction is located at the middle of the video in the horizontal direction. The upper video represents video of objects that are located vertically upward of 360-degree camera unit 17 (90 degrees), and the lower video represents video of objects that are located vertically downward of 360-degree camera unit 17 (−90 degrees).

For example, if specified range determination unit 203 determines the range of captured video corresponding to the north direction and the elevation angle of 20 degrees as a specified range, it means that specified range C1 centered around virtual sight direction B1 (the direction toward which the participant virtually looks), which indicates a position corresponding to the north direction and the elevation angle of 20 degrees in 360-degree video A1, is determined. Also, if specified range determination unit 203 determines the range of captured video corresponding to the southeast direction and the depression angle of 45 degrees as a specified range, it means that specified range C2 centered around virtual sight direction B2, which indicates a position corresponding to the southeast direction and the depression angle of 45 degrees in 360-degree video A1, is determined.

Specified range determination unit 203 generates information that indicates the azimuth and the angles of elevation and depression, which indicate the virtual sight direction, the angle of view, and the terminal ID of the terminal, as range information indicating the determined specified range, and transmits the range information to distribution server apparatus 30. Specified range acquisition unit 303 of distribution server apparatus 30 receives the transmitted range information, thereby acquiring the range of video specified by participant's terminal 20 identified by the terminal ID indicated by the range information, i.e. the specified range. Specified range acquisition unit 303 supplies range information indicating the acquired specified range to video clipping unit 302 and switching instruction acceptance unit 306.

Upon being supplied with the source data of content from source data acquisition unit 301, video clipping unit 302 clips video in the specified range indicated by the range information supplied from specified range acquisition unit 303 (in the example in FIG. 6, video in specified range C1 or video in specified range C2) out of the 360-degree video indicated by the supplied source data. Note that, if the forward direction of 360-degree camera unit 17 is tilted relative to the horizontal direction, 360-degree video A1 illustrated in FIG. 6 will be displaced in the vertical direction (the horizon will be displaced in the vertical direction).

Video clipping unit 302 corrects the tilt based on the orientation of the front face indicated by camera orientation information included in source data to acquire video like 360-degree video A1, and thereafter clips video in the specified range, for example. Well-known technology used in VR (Virtual Reality) or AR (Augmented Reality) may be used for this correction. Note that, instead of correcting the 360-degree video, video clipping unit 302 may calculate positions corresponding to the azimuth and the angles of elevation and depression in the tilted 360-degree video to clip video in the specified range.

Video clipping unit 302 supplies video thus clipped to content generation unit 304 together with the range information and the source data. Content generation unit 304 generates content indicating the supplied video, i.e. the video clipped in the range specified by participant's terminal 20, and ambient sound indicated by the supplied source data. Content generation unit 304 generates content data indicating the generated content and the terminal ID indicated by the supplied range information.

Also, content generation unit 304 adds, to the generated content data, the participant's voice indicated by the supplied source data and the direction corresponding to participant's terminal 20 used by the participant. Specifically, content generation unit 304 adds, to the content data, the direction indicated by the range of video specified from participant's terminal 20 (in the example in FIG. 6, virtual sight direction B1 (the north direction) or virtual sight direction B2 (the southeast direction)) as the direction corresponding to that participant's terminal 20.

Content generation unit 304 supplies content data thus generated to content data transmission unit 305. Content data transmission unit 305 transmits the supplied content data to participant's terminal 20 identified by the terminal ID indicated by the content data. Content output unit 204 of participant's terminal 20 outputs content indicated by the content data transmitted from distribution server apparatus 30.

Specifically, content output unit 204 outputs video indicated by the content data to the display of output unit 26 to display the video, and outputs ambient sound indicated by the content data to the speaker of output unit 26 to emit the sound. Content thus output is the video and ambient sound captured and recorded by the proxy user at the travel destination, and is content that provides the participant with virtual travel experience. The participant wearing participant's terminal 20 views content thus output.

To view content means to watch displayed video content and listen to emitted sound content. Note that to watch content that includes video but does not include sound is also referred to as "to view content". As described above, in the present embodiment, participant's terminal 20 is a display apparatus that displays 360-degree video (specifically, video clipped out of 360-degree video) acquired by source data acquisition unit 301.

Range information is transmitted from that participant's terminal 20, and thus a range of video is specified in association with that participant's terminal 20. Video clipping unit 302, specified range acquisition unit 303, content generation unit 304, and content data transmission unit 305 of distribution server apparatus 30 function as content distribution unit 307 that, upon receiving the range of video, clips the video in the range out of the 360-degree video acquired by source data acquisition unit 301, and distributes it to that participant's terminal 20. Content distribution unit 307 is an example of "a distribution unit" according to the present invention.

In the present embodiment, each participant's terminal 20 is provided with a speaker that outputs sound indicated by content data transmitted by content data transmission unit 305, as sound that comes from the direction indicated by the content data. Source data acquisition unit 301 of distribution server apparatus 30 acquires voice data transmitted from participant's terminal 20, thereby acquiring sound reaching that participant's terminal 20 (the participant's voice in the present embodiment). In this case, source data acquisition unit 301 is an example of "a sound acquisition unit" according to the present invention.

Content data transmission unit 305 of distribution server apparatus 30 transmits content data indicating sound acquired from participant's terminal 20 (the participant's voice) and the direction corresponding to that participant's terminal 20 (the direction indicated by the range of video specified by that participant's terminal 20) to another participant's terminal 20. In this case, "another participant's terminal 20" is an example of "a first display apparatus" according to the present invention, and "participant's terminal 20" from which "sound" is acquired is an example of "a second display apparatus" according to the present invention. Content data transmission unit 305 is an example of "a first transmission unit" according to the present invention.

Content output unit 204 of participant's terminal 20 controls the above-described speaker to output the participant's voice indicated by the transmitted content data as sound that comes from the direction indicated by the content data. For example, if a range of video in the east is specified by participant's terminal 20-2, content output unit 204 of participant's terminal 20-1 outputs the voice of the participant using the participant's terminal 20-2 such that the voice sounds as if it comes from the east.

In the present embodiment, switching instruction acceptance unit 306 of distribution server apparatus 30 uses the direction from which the voice comes from to accept an instruction (a switching instruction) to switch from video displayed on participant's terminal 20 to video displayed on another participant's terminal 20. Therefore, in the present embodiment, terminal orientation measurement unit 202 of participant's terminal 20 repeatedly transmits terminal orientation information that has been measured to distribution server apparatus 30 as well.

If terminal orientation information thus transmitted indicates that the orientation of the transmission source participant's terminal 20 is to be changed to the direction from which a voice recorded by another participant's terminal 20 comes from, switching instruction acceptance unit 306 accepts the terminal orientation information as a switching instruction that instructs to switch from the video displayed on the transmission source participant's terminal 20 to the video clipped in the range specified by participant's terminal 20 that has recorded the voice.

Figure 7A:
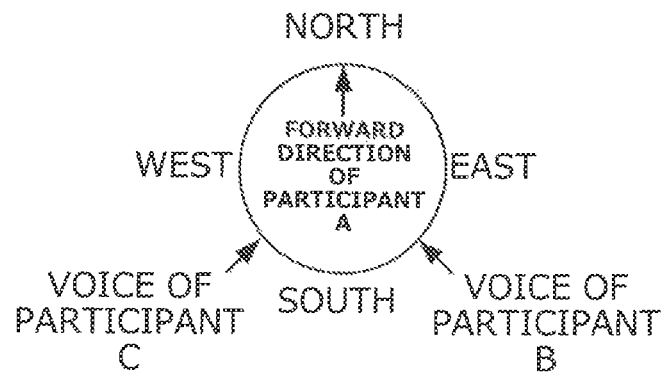
FIG. 7A is a diagram illustrating an example of a switching instruction.
Figure 7B:
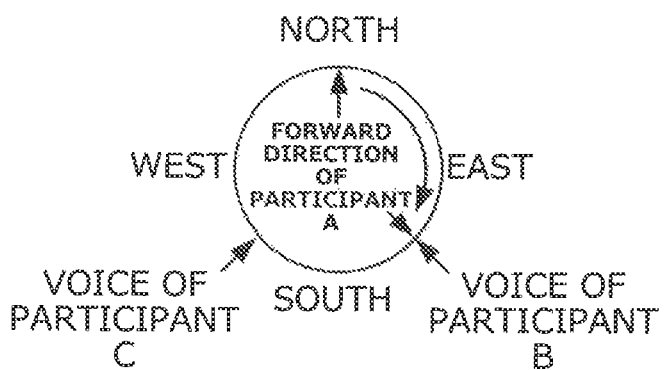
FIG. 7B is a diagram illustrating an example of a switching instruction.
Figure 7C:
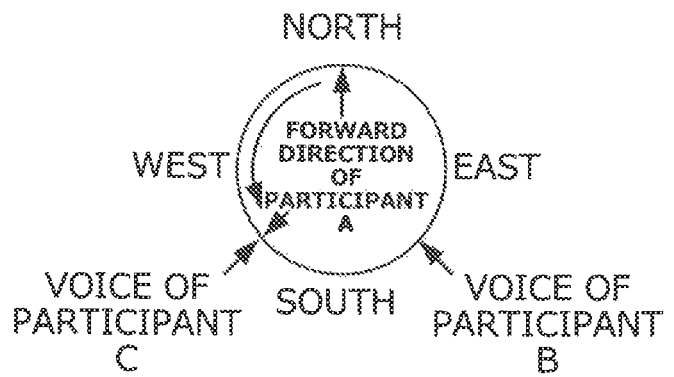
FIG. 7C is a diagram illustrating an example of a switching instruction.

FIGS. 7A to 7C illustrate examples of switching instructions. In FIGS. 7A to 7C, participant's terminals 20-1, 20-2, and 20-3 are used by participants A, B, and C. FIG. 7A illustrates that the forward direction of participant A (which is assumed to be the same as the forward direction of participant's terminal 20-1) is the north direction, the voice of participant B comes from the southeast, and the voice of participant C comes from the southwest.

FIG. 7B illustrates that participant A has changed the forward direction of participant's terminal 20-1 worn by participant A to the direction from which the voice of participant B comes from (the southeast). In this case, terminal orientation information indicating the southeast is transmitted from participant's terminal 20-1, and therefore switching instruction acceptance unit 306 accepts the terminal orientation information as a switching instruction that instructs to switch from the video displayed on participant's terminal 20-1 to the video clipped in the range specified by participant's terminal 20-2 (the video clipped according to the range specified in association with participant's terminal 20-2).

FIG. 7C illustrates that participant A has changed the forward direction of participant's terminal 20-1 worn by participant A to the direction from which the voice of participant C comes from (the southwest). In this case, terminal orientation information indicating the southwest is transmitted from participant's terminal 20-1, and therefore switching instruction acceptance unit 306 accepts the terminal orientation information as a switching instruction that instructs to switch from the video displayed on participant's terminal 20-1 to the video clipped in the range specified by participant's terminal 20-3 (the video clipped according to the range specified in association with participant's terminal 20-3).

Upon accepting the switching instruction, switching instruction acceptance unit 306 supplies content data transmission unit 305 with the terminal ID of participant's terminal 20 that has made the switching instruction (the switching source terminal ID of switching source participant's terminal 20) and the terminal ID of participant's terminal 20 that specifies the range of switching destination video (the switching destination terminal ID of switching destination participant's terminal 20). Content data transmission unit 305 switches the content data that is to be transmitted to participant's terminal 20 indicated by the supplied switching source terminal ID to content data that is transmitted to participant's terminal 20 indicated by the supplied switching destination terminal ID, and transmits it.

For example, if the switching instruction illustrated in FIG. 7B is made, content data transmission unit 305 switches the content data that is to be transmitted to participant's terminal 20-1 of participant A to content data that is transmitted to participant's terminal 20-2 of participant B, and transmits it. As a result, by turning to the direction from which the voice of participant B comes, participant A can view the video that is being viewed by participant B.

As described above, in the present embodiment, if an instruction to change the orientation of switching source participant's terminal 20 to the direction indicated by content data transmitted to that participant's terminal 20 is made, the above-described content distribution unit 307 (video clipping unit 302, specified range acquisition unit 303, content generation unit 304, and content data transmission unit 305) distributes video that is clipped according to a range of video specified in association with switching destination participant's terminal 20, to switching source participant's terminal 20.

Switching source participant's terminal 20 is an example of "a first display apparatus" according to the present invention, and switching destination participant's terminal 20 is an example of "a second display apparatus" according to the present invention. In this way, if a display switching instruction is made in association with switching source participant's terminal 20, content distribution unit 307 distributes video that is clipped according to a range of video specified in association with switching destination participant's terminal 20, to switching source participant's terminal 20.

Once content distribution unit 307 has switched content, content distribution unit 307 continues distributing the video clipped according to the specification by switching destination participant's terminal 20 until an instruction (a return instruction) to switch (return) video displayed on participant's terminal 20, which is video displayed on another participant's terminal 20, to the original video is accepted. Switching instruction acceptance unit 306 accepts this return instruction. For example, if terminal orientation information that indicates a gesture for returning the video to the original (a returning gesture) is transmitted, switching instruction acceptance unit 306 accepts the transmitted terminal orientation information as a return instruction.

A return gesture is, for example, a gesture made by slightly shaking one's head. In this case, if the azimuth indicated by the terminal orientation information changes twice in a predetermined period, for example, switching instruction acceptance unit 306 determines that a gesture has been made, and accepts a return instruction. Note that a return gesture may be a gesture made by nodding one's head up and down, moving one's face such that the forward direction of the face moves in a circle, or the like. Also, the user may be allowed to set a movement of head as a return gesture.

Also, a gesture may be used as an operation performed to switch to video displayed on another participant's terminal 20, in addition to as an operation performed to return video to the original video. In such a case, any of the above-described plurality of gestures may be used as the switching operation. Also, switching instruction acceptance unit 306 may accept a return instruction not only when a return gesture is made, but also when a predetermined operation (e.g. an operation to touch a predetermined controller) is performed on input unit 25 of participant's terminal 20, for example.

Upon switching instruction acceptance unit 306 accepting a return instruction, content data transmission unit 305 switches content data that is to be transmitted to participant's terminal 20 by which a return instruction has been made, to content data indicating the terminal ID of that participant's terminal 20, and transmits it. Thus, the participant can return the display from video that is viewed by another participant to video that is in the range specified by the participant.

Based on the above-described configuration, the apparatuses included in virtual travel system 1 perform a provision process through which virtual travel content is provided to a participant.

Figure 8:
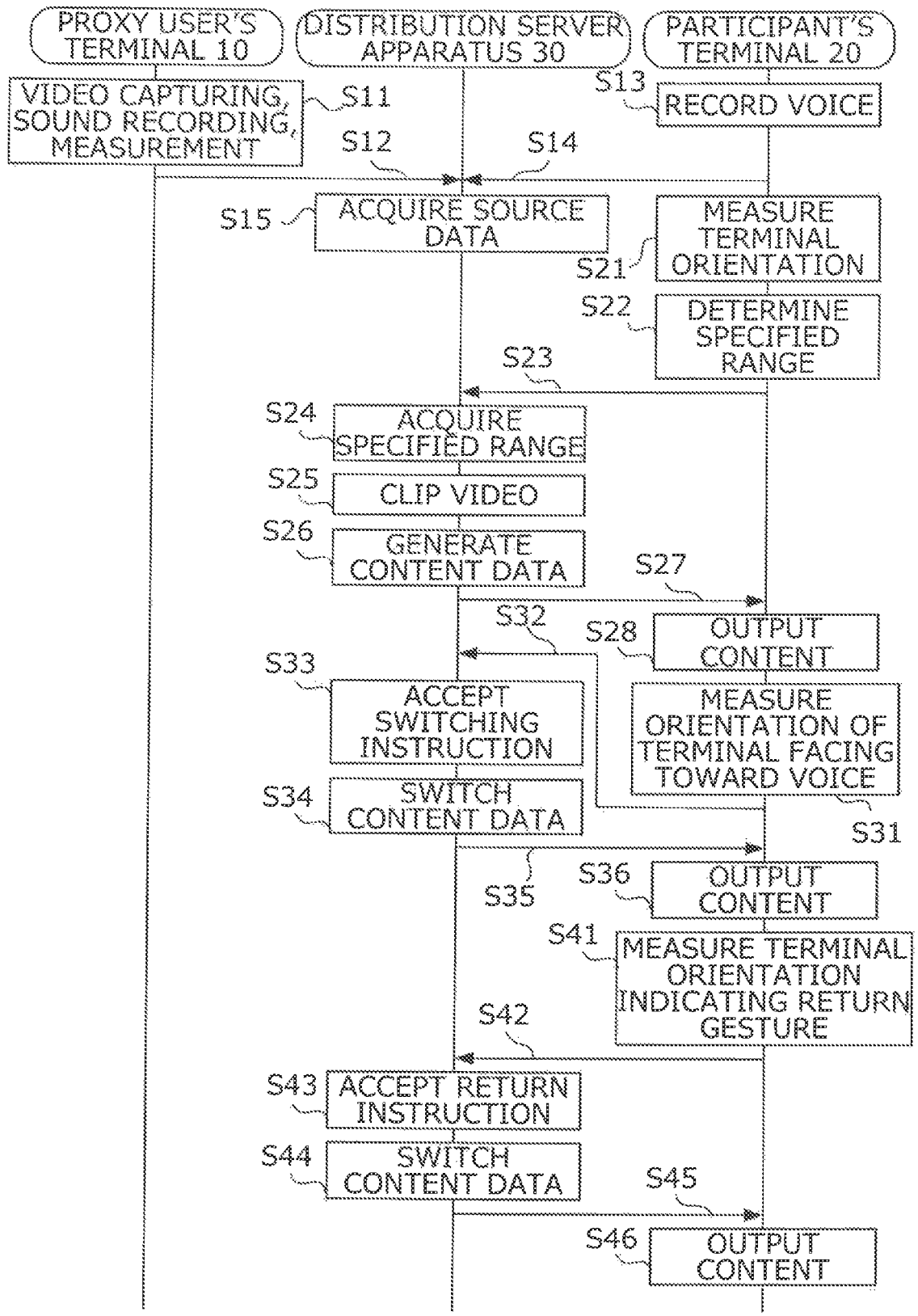
FIG. 8 is a diagram illustrating an example of operation sequences carried out by apparatuses in a provision process.

FIG. 8 is illustrates an example of operation sequences carried out by apparatuses in a provision process. These operation sequences are started at the start time of the virtual travel service, for example. First, proxy user's terminal 10 (video capturing unit 101, ambient sound recording unit 102, and camera orientation measurement unit 103) captures 360-degree video around the proxy user, records ambient sound, and measures camera orientation information (step S11).

Next, proxy user's terminal 10 (capture data transmission unit 104) transmits capture data acquired as a result of the operations in step S11, to distribution server apparatus 30 (step S12). In parallel with steps S11 and S12, participant's terminal 20 (voice recording unit 201) records the voice of the participant wearing the terminal (step S13), and transmits voice data indicating the recorded voice to distribution server apparatus 30 (step S14).

Distribution server apparatus 30 (source data acquisition unit 301) acquires the capture data and the voice data transmitted in steps S12 and S14, as source data of content that is to be distributed by that apparatus (step S15). Next, participant's terminal 20 (terminal orientation measurement unit 202) measures information indicating the orientation of the terminal (terminal orientation information) (step S21). Subsequently, participant's terminal 20 (specified range determination unit 203) determines a specified range of video that is to be displayed on the terminal, based on the measured terminal orientation information (step S22), and transmits range information indicating the determined specified range to distribution server apparatus 30 (step S23).

Distribution server apparatus 30 (specified range acquisition unit 303) acquire the specified range by receiving the transmitted range information (step S24). Next, distribution server apparatus 30 (video clipping unit 302) clips video in the acquired specified range out of 360-degree video indicated by the source data acquired in step S15 (step S25). Subsequently, distribution server apparatus 30 (content generation unit 304) generates content data indicating the clipped video, the recorded ambient sound, the recorded voice of the participant, and the direction corresponding to participant's terminal 20 by which the voice was recorded (step S26).

Thereafter, distribution server apparatus 30 (content data transmission unit 305) transmits the generated content data to participant's terminal 20 that has specified a range of video (step S27). Participant's terminal 20 (content output unit 204) outputs content indicated by the transmitted content data (step S28). At this time, participant's terminal 20 (content output unit 204) outputs the participant's voice indicated by the content data as sound that comes from the direction indicated by the content data.

Here, it is assumed that participant's terminal 20 (terminal orientation measurement unit 202) measures terminal orientation information when the front face of the terminal is orientated in the direction from which the participant' voice comes from (step S31). Participant's terminal 20 (terminal orientation measurement unit 202) transmits the measured terminal orientation information to distribution server apparatus 30 (step S32). The transmitted terminal orientation information indicates that the orientation of participant's terminal 20 at the transmission source is to be changed to the direction from which the recorded voice of another participant's terminal 20 comes, and therefore distribution server apparatus 30 (switching instruction acceptance unit 306) accepts the transmitted terminal orientation information as a switching instruction (step S33).

Next, distribution server apparatus 30 (content data transmission unit 305) switches content data that is to be transmitted to participant's terminal 20 at the switching source to content data that is to be transmitted to participant's terminal 20 at the switching destination (step S34), and transmits the content data to participant's terminal 20 at the switching source (step S35). Participant's terminal 20 (content output unit 204) at the switching source outputs content indicated by the transmitted content data (step S36).

After step S36, upon measuring terminal orientation information indicating the above-described return gesture (step S41), participant's terminal 20 (terminal orientation measurement unit 202) transmits the measured terminal orientation information to distribution server apparatus 30 (step S42). Because the transmitted terminal orientation information indicates a return gesture, distribution server apparatus 30 (switching instruction acceptance unit 306) accepts the transmitted terminal orientation information as a return instruction (step S43).

Next, distribution server apparatus 30 (content data transmission unit 305) switches content data that is to be transmitted to participant's terminal 20 at which the return instruction was made to content data that indicates video for which a range was specified by that participant's terminal 20 (step S44), and transmits the content data to that participant's terminal 20 (step S45). Participant's terminal 20 (content output unit 204) outputs content indicated by the transmitted content data (step S46).

In the present embodiment, each user (participant) specifies a range of video that he/she wishes to view, by changing the direction in which the front face of participant's terminal 20 worn by him/her is orientated. On the other hand, upon the front face of participant's terminal 20 being orientated in the direction from which the voice of another user comes, video in the range specified by the user is displayed. As a result, it is easier to switch to video that is viewed by another user compared to a case in which the user asks the other user about the range of video that is viewed by the other user, for example.

Also, in the present embodiment, another user's voice comes from the direction indicated by the range of video specified by participant's terminal 20 of the other user, and video viewed by the participant is displayed when the user turns to the direction. As a result, by switching video, the user can discern the direction in which the other viewer viewing the switching destination video is orientated.

2. Variations

The above-described embodiment is merely an example for carrying out the present invention, and the following variations are possible as well.

2-1. To Display Content in the Past

For example, a participant hears a joyful voice of another participant, and views video that is the same as video viewed by the other participant. However, a scene that has attracted the other participant's attention (e.g. a puppet show performed on an automation clock) may have been finished when the participant see it. Therefore, content (video and sound) that was output to participant's terminal 20 of the other participant in the past may be output.

Figure 9:
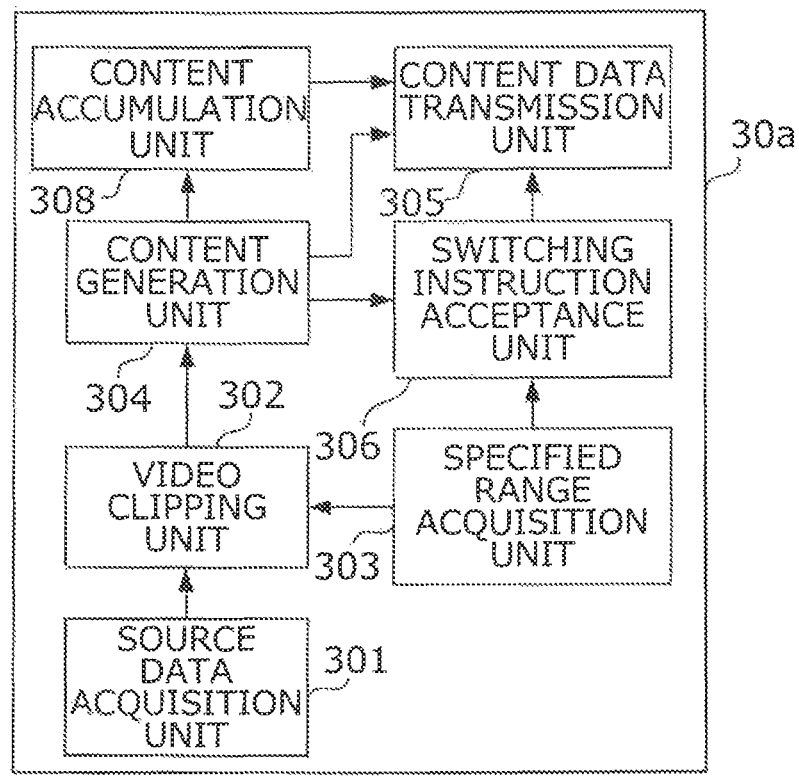
FIG. 9 is a diagram illustrating a functional configuration realized by a distribution server apparatus according to a variation.

FIG. 9 illustrates a functional configuration realized by distribution server apparatus 30a according to the present variation. Distribution server apparatus 30a includes content accumulation unit 308 in addition to the units illustrated in FIG. 5. In the present variation, content generation unit 304 supplies generated content data to content accumulation unit 308 as well.

Content accumulation unit 308 stores supplied content data, and thus accumulates content distributed to participant's terminal 20 with the terminal ID indicated by the content data. By accumulating content, content accumulation unit 308 also accumulates 360-degree video acquired by source data acquisition unit 301. Content accumulation unit 308 is an example of "an accumulation unit" according to the present invention. Content accumulation unit 308 also accumulates ambient sound and the voice of the participant as well as 360-degree video.

In the present variation, for example, if terminal orientation information transmitted from participant's terminal 20 indicates that the orientation of the transmission source participant's terminal 20 is to be changed to the direction from which a voice recorded by another participant's terminal 20 comes from, switching instruction reception unit 306 accepts the terminal orientation information as a switching instruction that instructs to switch from the video displayed on the transmission source participant's terminal 20 to the clipped video in the range that was specified in the past (e.g. at a past point in time that is backward by a period of time) by participant's terminal 20 that has recorded the voice.

Content distribution unit 307 distributes, to switching source participant's terminal 20, video that was clipped in the past according to a range of video specified in association with switching destination participant's terminal 20 out of video accumulated in content accumulation unit 308. Also, content distribution unit 307 distributes, to switching source participant's terminal 20, ambient sound in the past and the participant's voice in the past as well as the video clipped in the past. Thus, even after a scene that has attracted another participant's attention has ended, a participant can enable his or her own participant's terminal 20 to output content that represents the scene.

Note that content distribution unit 307 may distribute content as of a past point in time that is backward by a period of time specified by the participant, instead of content as of a past point in time that is backward by a predetermined period of time. The length of the period of time in the backward direction may be specified using a gesture represented by terminal orientation information (e.g. the period increases in the backward direction as the number of times the participant shakes his or her head increases) as with the above-described return instruction, or specified by performing a predetermined operation on input unit 25 of participant's terminal 20 (e.g. the period increases in the backward direction as the number of touches increases), for example.

Content distribution unit 307 may first distribute the content that is currently distributed to switching destination participant's terminal 20 to switching source participant's terminal 20 as in the embodiment, and distributes the past content when the length of the period of time in the backward direction is specified. As a result, even if a participant causes participant's terminal 20 to output the same content as another participant, but finds out that a scene that has attracted the participant's attention has ended, the participant can thereafter cause his or her own participant's terminal 20 to output content that represents the scene.

In the example in FIG. 9, content accumulation unit 308 accumulates content that indicates clipped video. However, content accumulation unit 308 may accumulate source data, for example. In this case, video clipping unit 302 clips video in the range specified by switching destination participant's terminal 20 out of 360-degree video indicated by the source data accumulated in content accumulation unit 308, and content generation unit 304 generates content that includes the clipped video.

Content distribution unit 307 distributes content thus generated to switching source participant's terminal 20. In this case, it is not necessary to accumulate content for all participant's terminals 20, and it is only necessary to store source data. Therefore, compared to accumulate clipped content, it is possible to suppress an increase in the required storage capacity when the number of participant's terminals 20 increases.

2-2. Direction of Sound

In the Embodiment, a direction indicated by the range of video specified by participant's terminal 20 is used as the direction from which another participant's voice comes, i.e. the direction corresponding to participant's terminal 20. For example, when participant B is viewing video of objects in the southwest, the speaker of participant's terminal 20-1 of participant A emits the voice of participant B as sound coming from the southwest. However, the present invention is not limited in this way.

For example, if there is one other participant, sound may be emitted such that sound comes from one predetermined direction (e.g. from directly above), and if there are a plurality of other participants, sound may be emitted such that sound comes from a plurality of predetermined directions (e.g. directions are determined to be at equal intervals such that the directions of sound can be easily distinguished from each other). Even in this case, by turning to the direction from which a voice comes, participant can view video that is the same as video viewed by another participant who uttered the voice.

2-3. Switching Instruction

In the embodiment, in order to make a switching instruction, a direction corresponding to another participant is represented as a direction from which sound comes. However, it may be represented using an image. If this is the case, content generation unit 304 generates content that indicates video that includes an image that indicates the direction corresponding to switching destination participant's terminal 20 (a direction instructing image).

Figure 10:
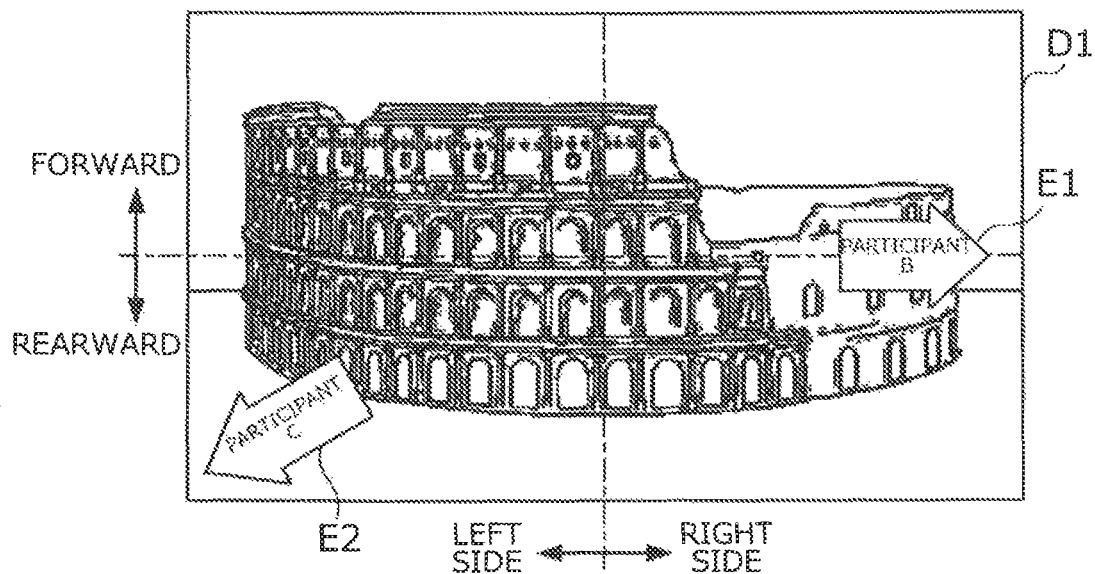
FIG. 10 is a diagram illustrating an example of video output according to a variation.

FIG. 10 illustrates an example of video output according to the present variation. FIG. 10 illustrates video D1 that is output on participant's terminal 20 of participant A, which includes direction instructing image E1 corresponding to participant B and direction instructing image E2 corresponding to participant C. In this example, the upper half of video D1 relative to the center in the vertical direction represents a forward direction viewed from participant A, the lower half represents a rear direction viewed from participant, the right half relative to the center in the horizontal direction represents the right side viewed from participant, and the left half represents the right side viewed from participant A.

In the example in FIG. 10, it is assumed that the forward direction coincides with the north direction. Direction instructing image E1 is an arrow directed to the right at the center in the vertical direction, which indicates that participant B faces to the right relative to participant A (i.e. to the east). Direction instructing image E2 is an arrow directed to the left on the lower side in the vertical direction, which indicates that participant C faces to the left and rearward relative to participant A (i.e. to the southwest).

Content data transmission unit 305 transmits content data indicating video including a direction instructing image indicating the direction corresponding to switching destination participant's terminal 20 as illustrated in FIG. 10, to switching source participant's terminal 20. In this case, content data transmission unit 305 is an example of "a second transmission unit" according to the present invention. In the present variation, switching instruction acceptance unit 306 accepts a switching instruction using the direction indicated by this direction instructing image.

When the transmitted terminal orientation information indicates that the orientation of transmission source participant's terminal 20 is to be changed to the direction indicated by the direction instructing image (the direction corresponding to another participant's terminal 20), switching instruction acceptance unit 306 accepts video displayed on transmission source participant's terminal 20 as a switching instruction that instructs to switch to video that is clipped according to the range specified by participant's terminal 20 corresponding to the direction.

In the example in FIG. 10, if terminal orientation information that instructs to change the orientation of the terminal to the east is transmitted from participant's terminal 20-1 of participant A, switching instruction acceptance unit 306 accepts the terminal orientation information as a switching instruction that instructs to switch the video displayed on participant's terminal 20-1 to video clipped in the range specified by participant's terminal 20-2 of participant B corresponding to the direction. If terminal orientation information that instructs to change the orientation of the terminal to the southwest is transmitted, switching instruction acceptance unit 306 accepts the terminal orientation information as a switching instruction that instructs to switch the video to video clipped in the range specified by participant's terminal 20-3 of participant C.

In the present variation, if an instruction is made to change the orientation of switching source participant's terminal 20 to the direction indicated by the direction instructing image transmitted to switching source participant's terminal 20 by content data transmission unit 305, content distribution unit 307 distributes video clipped according to the video range specified in association with switching destination participant's terminal 20 to switching source participant's terminal 20. In this case, the direction to which participant should face is indicated by only using an image. Therefore, it is possible to make a switching instruction even in a noisy situation where it is difficult to hear sound.

2-4. Narrowing Down Other Participants

When there are many participants, if the voices of all of the participants can be heard, it is difficult to discern each voice. Also, even in a case where direction instructing images are displayed as in the example in FIG. 10, if the number of direction instructing images increases, it becomes difficult to view travel destination video, which is the main content. Therefore, other participants of which voices or direction instructing images are to be included in content may be narrowed down.

Figure 11:
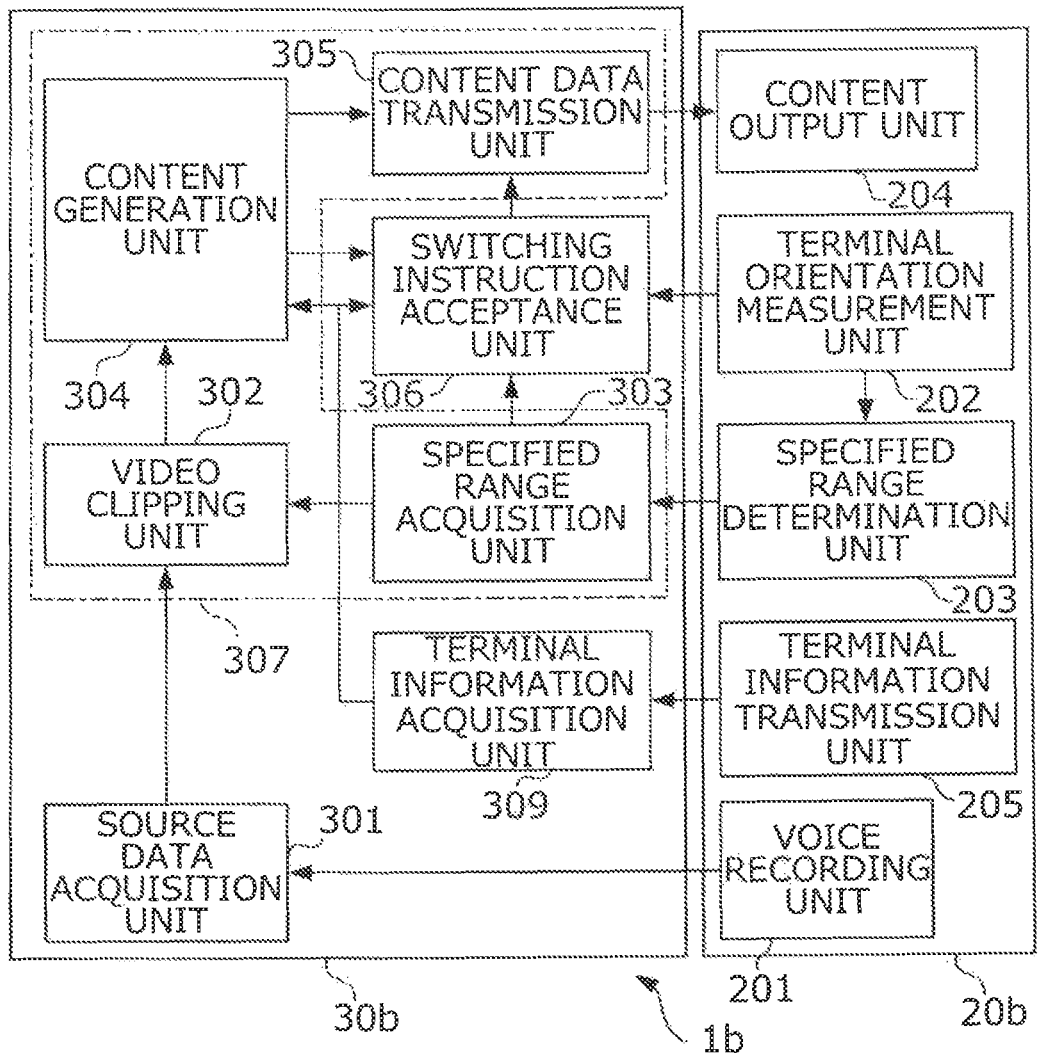
FIG. 11 is a diagram illustrating a functional configuration realized by a virtual travel system according to a variation.

FIG. 11 illustrates a functional configuration realized by virtual travel system 1b according to the present variation. Virtual travel system 1b includes participant's terminal 20b and distribution server apparatus 30b. Participant's terminal 20b includes terminal information transmission unit 205 in addition to the units illustrated in FIG. 5, and distribution server apparatus 30b includes terminal information acquisition unit 309 in addition to the units illustrated in FIG. 5. Terminal information transmission unit 205 generates information regarding the terminal (terminal information) and transmits it to distribution server apparatus 30b.

Sensor unit 27 of participant's terminal 20b includes a positioning sensor such as a GPS (Global Positioning System). Terminal information transmission unit 205 generates position information indicating the position of the terminal measured by the positioning sensor as terminal information, and transmits it to distribution server apparatus 30b. Terminal information acquisition unit 309 of distribution server apparatus 30b acquires the transmitted terminal information, i.e., position information indicating the position of participant's terminal 20b. In this case, terminal information acquisition unit 309 is an example of "a position acquisition unit" according to the present invention.

Terminal information acquisition unit 309 supplies the acquired terminal information to content generation unit 304 and switching instruction acceptance unit 306. Content generation unit 304 generates, as content that is to be distributed to participant's terminal 20b, content that includes a voice recorded by participant's terminal 20b of which position information indicating a position that is at a distance within a predetermined range to the aforementioned participant's terminal 20b has been acquired as terminal information.

For example, it is assumed that the predetermined range is 50 m, participants A and B participate in a virtual travel service in the same room, and participant C participates in the virtual travel service in a different location that is away from the room by 50 m or more. If this is the case, the distance between the positions indicated by position information acquired from participant's terminals 20b of participants A and B is within the predetermined range, and the distance between the positions indicated by position information acquired from participant's terminals 20b of participants A and C is out of the predetermined range.

In this case, content generation unit 304 generates, as content that is to be distributed to participant's terminal 20b of participant A, content that includes the voice of participant B recorded by participant's terminal 20b and does not include the voice of participant C recorded by participant's terminal 20b. As a result, participant A can only hear the voice of the participant (participant B in this example) near participant A.

As described above, participants whose voices can be heard are narrowed down. Therefore, switching instruction acceptance unit 306 accepts a switching instruction upon receiving terminal orientation information indicating that the orientation of participant's terminal 20b is to be changed to the direction from which the voices of the participants thus narrowed down come from. As described above, content distribution unit 307 determines participant's terminal 20b from which position information indicating a position that is at a distance within the predetermined range to switching source participant's terminal 20b has been acquired, as switching destination participant's terminal 20b, and distributes content (distributes content that is to be distributed to switching destination participant's terminal 20b to switching source participant's terminal 20b as well).

In the present variation, as described above, content that is to be distributed to a participant is switched only to content that is to be distributed to other participants at a distance within a predetermined range from the participant. Therefore, a participant can share experience only with participants in the range. Also, compare to a case where voices of all participants can be heard, it is easier to discern the voice of each participant. Also, compared to a case where the direction instructing images of all of the other participants are displayed, it is easier to view video.

Note that participants may be narrowed down in another way. For example, since anyone can participate in a virtual travel service, there may be a participant who speaks in a different language. In such a case, participants may be narrowed down to those who speak in the same language. In this case, terminal information transmission unit 205 of participant's terminal 20b generates, as terminal information, language information indicating the languages that has been set to the terminal (e.g. the language that is displayed on the menu screen), and transmits it to distribution server apparatus 30b.

Terminal information acquisition unit 309 of distribution server apparatus 30b acquires the transmitted terminal information, i.e., language information indicating the language used in participant's terminal 20b. In this case, terminal information acquisition unit 309 is an example of "a language acquisition unit" according to the present invention. Content generation unit 304 generates, as content that is to be distributed to participant's terminal 20b, content that includes a voice recorded by participant's terminal 20b of which language information indicating the same language as the language used in the aforementioned participant's terminal 20b has been acquired as terminal information.

As a result, a participant can hear the voices of participants who speak the language that is the same as the language (to be exact, the language that has been set to his or her own participant's terminal 20b) that is spoken by the participant (to be exact, a participant can hear the voices of participants who have set to participant's terminals 20b the same language as the language set by the participant). Switching instruction acceptance unit 306 accepts a switching instruction when terminal orientation information indicating that the orientation of participant's terminal 20b is to be changed to the direction from which the voices of the participants thus narrowed down come from.

As described above, content distribution unit 307 determines participant's terminal 20b of which the language information acquired therefrom indicates the same language as the language used in switching source participant's terminal 20b, as switching destination participant's terminal 20b, and distributes content. Thus, content that is to be distributed to a participant can be switched only to content that is to be distributed to other participants who speak the same language as the participant. Also, by narrowing down the participants, it becomes easier to discern the voice of each participant, and it becomes easier to view video in the same manner as in the case where position information is used.

Note that the method for acquiring language information is not limited to that described above. For example, terminal information acquisition unit 309 may acquire, as terminal information, language information that has been registered in advance by a participant or the provider of a virtual travel service. Also, terminal information acquisition unit 309 may acquire terminal information indicating an IP address that has been assigned to participant's terminal 20b. The location of participant's terminal 20b can be identified using the IP address. Therefore, terminal information acquisition unit 309 acquires the IP address as language information indicating a standard language used in a specified location.

Participants may be narrowed down in another way. For example, since a participant in any region in the world can participate in a virtual travel service, and there may be a participant who lives in a region in a different standard time zone. For example, daytime in a region where one participant lives may be night time in a region where another participant lives. For example, in a case where a virtual travel service is provided for a long period and participants can participate in or withdraw from the service in the middle, the times at which the participants participate in the service become more likely to be different from each other as the difference between the standard time zones of the regions in which the participant live increases. Therefore, participants may be narrowed down to those who live in regions in similar standard time zones.

In this case, terminal information transmission unit 205 of participant's terminal 20b generates, as terminal information, time zone information indicating the standard time zone that has been set to the terminal, and transmits it to distribution server apparatus 30b. Terminal information acquisition unit 309 of distribution server apparatus 30b acquires the transmitted terminal information, i.e., time zone information indicating the standard time zone used at the position of participant's terminal 20b. In this case, terminal information acquisition unit 309 is an example of "a time zone acquisition unit" according to the present invention.

Note that time zone information is not limited to information that indicates the standard time zone that has been set, and may be information indicating the position of the terminal (because the standard time zone can be known from the position). Content generation unit 304 generates, as content that is to be distributed to participant's terminal 20b, content that includes a voice recorded by participant's terminal 20b of which the standard time zone indicated by the time zone information acquired therefrom has a time difference that is smaller than a threshold value when compared to the standard time zone indicated by the time zone information acquired from the aforementioned participant's terminal 20b.

For example, in a case of content that is to be distributed to participant's terminal 20b of participant A, if the time difference between standard time zones indicated by time zone information acquired for participant's terminal 20b of participant A and time zone information acquired for participant's terminal 20b of participant B is smaller than the threshold value, content generation unit 304 generates content that includes the voice recorded by participant's terminal 20b of participant B.

As a result, a participant can only hear the voices of participants in the region in the same standard time zone as the participant. Switching instruction acceptance unit 306 accepts a switching instruction when terminal orientation information indicating that the orientation of participant's terminal 20b is to be changed to the direction from which the voices of the participants thus narrowed down according to the standard time zones of the regions where the participants are present come from.

As described above, content distribution unit 307 determines participant's terminal 20b of which the time zone information acquired therefrom indicates a standard time zone that has a time difference smaller than the threshold value when compared to the standard time zone of the time zone information acquired from switching source participant's terminal 20b, as switching destination participant's terminal 20b, and distributes content. Thus, content that is to be distributed to a participant can be switched only to content that is to be distributed to other participants in regions in standard time zones that are similar to the standard time zone of the participant. Also, by narrowing down the participants, it becomes easier to discern the voice of each participant, and it becomes easier to view video in the same manner as in the case where position information is used.

2-5. Participation in a Group

It may be possible to participate in a virtual travel service in a group. In such a case, for example, any of the users who belong to a group serves as a representative, and when applying to participate in the service, the representative registers information regarding other participants in the group, such as families or friends who travel with the representative. Content distribution unit 307 issues a group ID that identifies the registered group.

If there is identification information that is used in an existing service, it may be used as the group ID. In the present variation, the functional configuration illustrated in FIG. 11 is realized. Distribution server apparatus 30b notifies participant's terminal 20b of the group ID when notifying it of a participation call or the start of a travel. Terminal information transmission unit 205 of participant's terminal 20b transmits the notified group ID to distribution server apparatus 30b as terminal information.

Content generation unit 304 of distribution server apparatus 30b generates, as content that is to be distributed to participant's terminal 20b, content that includes a voice recorded by participant's terminal 20b from which the same group ID has been acquired as terminal information. As a result, a participant can only hear the voices of other participants belonging to the same group, and a participant can share experience only with these participants.

2-6. Plurality of Proxy user's Terminals

There may be a plurality of proxy user's terminals that capture video at a travel destination.

Figure 12:
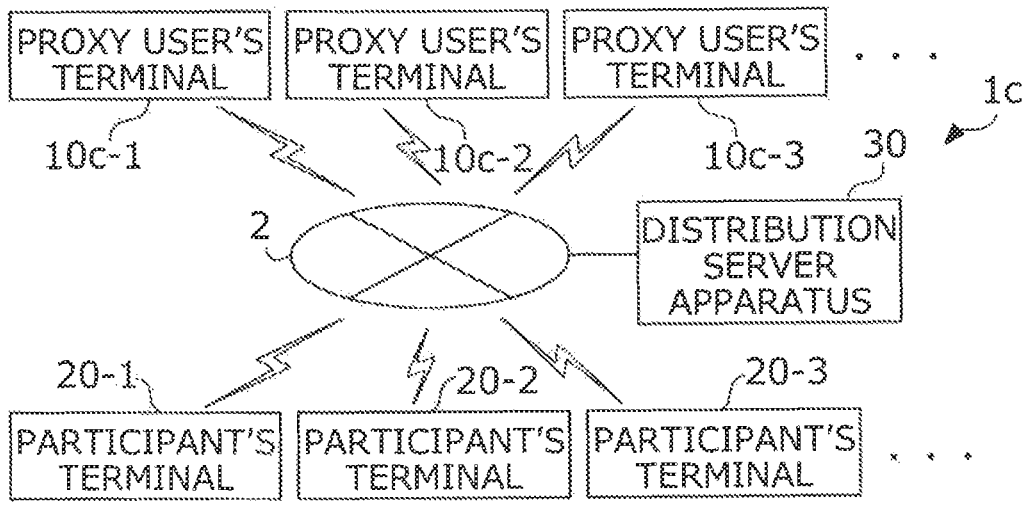
FIG. 12 is a diagram illustrating an overall configuration of a virtual travel system according to a variation.

FIG. 12 illustrates an overall configuration of virtual travel system 1c according to the variation. Virtual travel system 1c includes proxy user's terminals 10c-1, 10c-2, 10c-3, and so on (hereinafter referred to as "proxy user's terminals 10c when they are not distinguished from each other), instead of proxy user's terminal 10 illustrated in FIG. 1. Every proxy user's terminal 10c has the same hardware configuration and functional configuration as proxy user's terminal 10 illustrated in FIG. 1.

Figure 13:
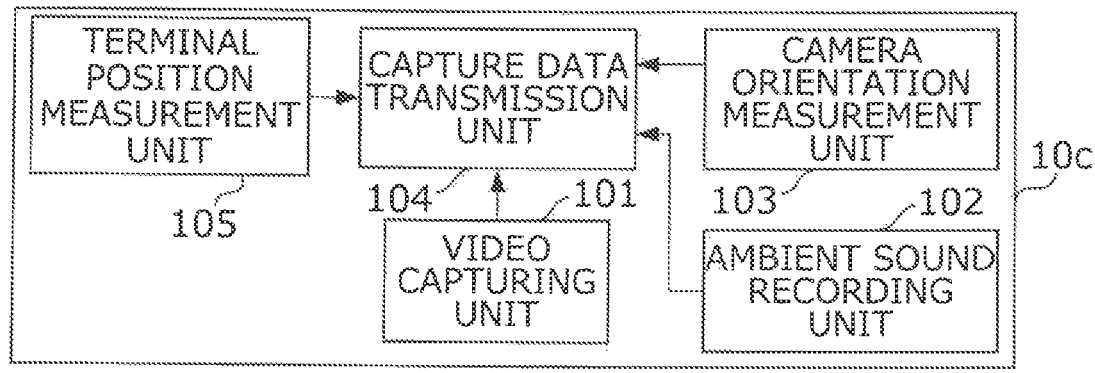
FIG. 13 is a diagram illustrating a functional configuration realized by a proxy user's terminal according to the variation.

FIG. 13 illustrates a functional configuration realized by proxy user's terminal 10c according to the present variation. Proxy user's terminal 10c includes terminal position measurement unit 105 in addition to the units illustrated in FIG. 5. Terminal position measurement unit 105 measures the position of the terminal, using technology such as GPS. Terminal position measurement unit 105 repeatedly measures the position of the terminal while simultaneously supplying position information indicating the measured position to capture data transmission unit 104.

Capture data transmission unit 104 transmits the supplied data indicating the position information to distribution server apparatus 30 as capture data. Source data acquisition unit 301 of distribution server apparatus 30 acquires capture data transmitted from proxy user's terminal 10c as source data, and thus acquires the position information indicating the position of proxy user's terminal 10c indicated by the capture data.

An operation to select proxy user's terminal 10c that is to capture video that is to be included in the content that is to be distributed is performed on each participant's terminal 20. This operation may be performed using input unit 25, or performed through a predetermined gesture represented by terminal orientation information. Specified range determination unit 203 of participant's terminal 20 transmits range information indicating the terminal ID of proxy user's terminal 10c thus selected, to distribution server apparatus 30, in addition to the determined specified range.

Specified range acquisition unit 303 receives the transmitted range information, thereby acquiring the range of video specified in the video of proxy user's terminal 10c identified by the terminal ID indicated by the range information, i.e. the specified range. Video clipping unit 302 clips the range of video specified by the acquired range information, i.e. the specified range in the video of proxy user's terminal 10c selected by the participant. Content generation unit 304 generates content data that indicates video thus clipped out, i.e. video clipped out of video captured by proxy user's terminal 10c selected by the participant.

Content data transmission unit 305 transmits the generated content data to participant's terminal 20. As described above, in the present variation, content distribution unit 307 distributes content that includes video clipped out of the video captured by proxy user's terminal 10c selected by a participant, to participant's terminal 20 of the participant. Also, while content is being output, a participant may change a proxy user (proxy user's terminal 10c) to another proxy user who captures video that the participant wishes to view. The following describes an example in which such a proxy user change is performed using a predetermined gesture represented by terminal orientation information.

Figure 14:
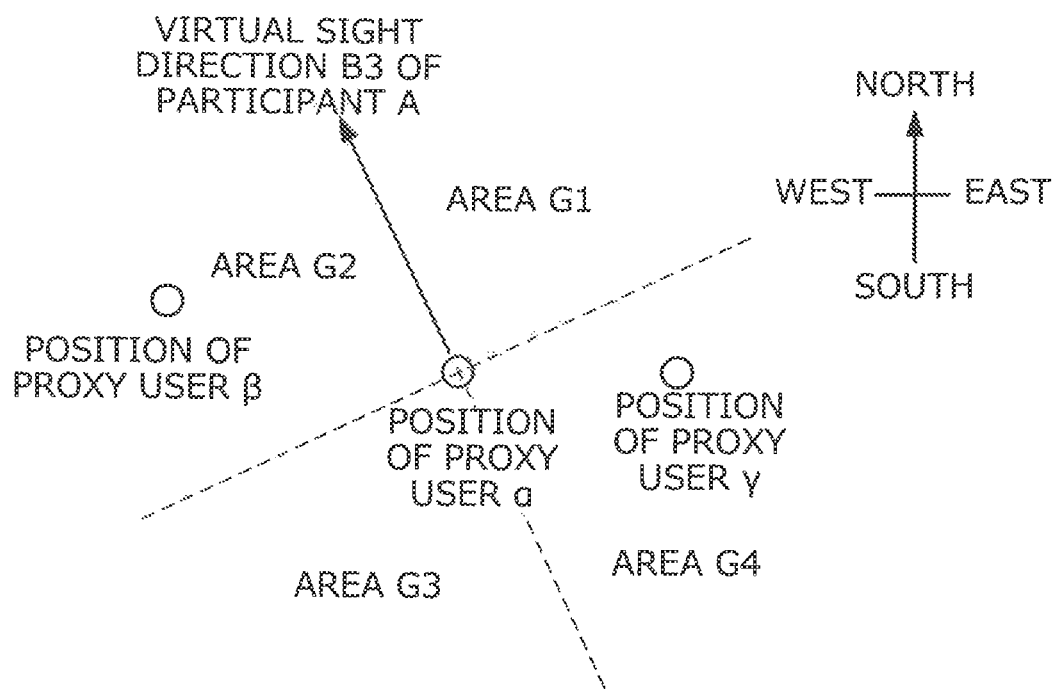
FIG. 14 is a diagram illustrating an example of a positional relationship between proxies.

FIG. 14 illustrates an example of a positional relationship between proxies. In the example in FIG. 14, participant A is viewing video captured by proxy user's terminal 10c of proxy user α, and an area defined such that the north-northwest direction from the position of the proxy user α coincides with virtual sight direction B3 is specified. Here, in a case where virtual sight direction B3 when seen from the proxy user α is defined as the forward direction, if an area located forward and on the right is defined as area G1, an area located forward and on the left is defined as area G2, an area located rearward and on the left is defined as area G3, and an area located rearward and on the right is defined as area G4, proxy user β is located in area G2, and proxy user γ is located in area G4.

Content generation unit 304 determines the positional relationship of a plurality of proxy user's terminals 10c based on the positions of proxy user's terminals 10c indicated by source data (capture data) acquired therefrom and the azimuth of the virtual sight direction (virtual sight direction B3 in this example) indicated by the range information acquired from participant's terminal 20. In the case of the positional relationship illustrated in FIG. 14, content generation unit 304 generates content that indicates video illustrated in FIG. 15, for example.

Figure 15:
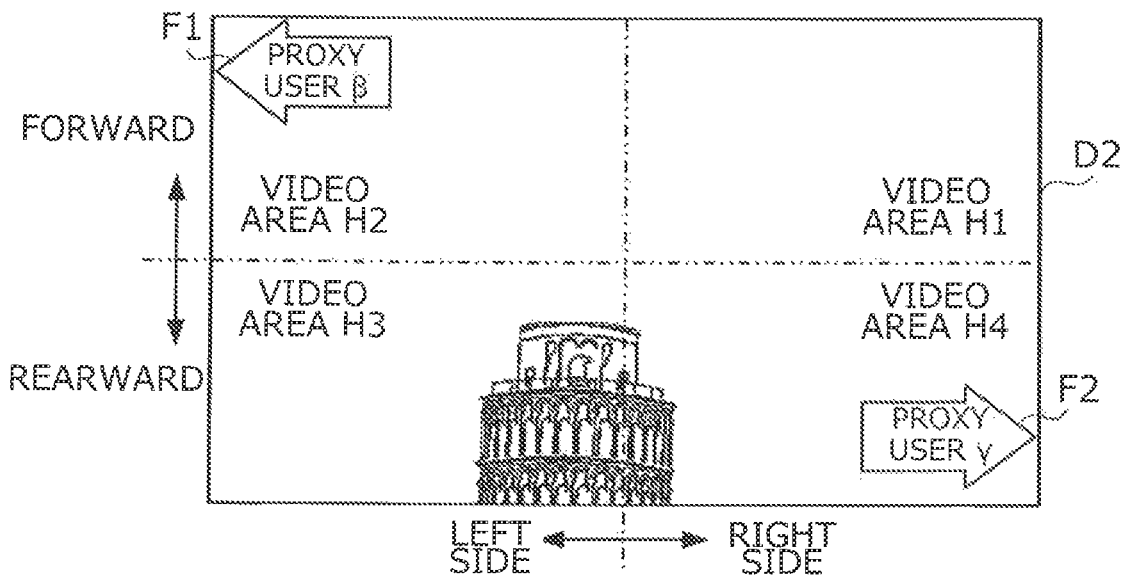
FIG. 15 is a diagram illustrating an example of generated video.

FIG. 15 illustrates an example of generated video. The example in FIG. 15 illustrates video D2 that is displayed when participant A looks up at the sky. Video D2 is video captured by proxy user α and viewed by participant A. In video D2, video area H1 on the upper right side is associated with area G1 illustrated in FIG. 14, video area H2 on the upper left side is associated with area G2, video area H3 on the lower left side is associated with area G3, and video area H4 on the lower right side is associated with area G4.

Based on the positional relationship illustrated in FIG. 14, content generation unit 304 generates content that indicates video D2 in which switching image F1 that indicates switching to video captured by proxy user β located in area G2 is superimposed on video area H2, and switching image F2 that indicates switching to video captured by proxy user γ located in area G4 is superimposed on video area H4. Switching images F1 and F2 have the shapes of arrows directed to proxies β and γ (directed to the left and the right), and indicate the left or the right direction in which each proxy user is present.

When generating content that includes switching images as illustrated in FIG. 15, content generation unit 304 supplies the terminal IDs of proxy user's terminals 10c indicated by the switching images and the directions indicated by the switching images to switching instruction acceptance unit 306. It is assumed that terminal orientation information that instructs to change the orientation of the terminal to the direction indicated by a switching image is transmitted to distribution server apparatus 30 from participant's terminal 20 to which the content has been distributed.

In such a case, switching instruction acceptance unit 306 accepts the terminal orientation information as a switching instruction that instructs to switch from the video displayed on that participant's terminal 20 to video that is to be clipped out of the video captured by proxy user's terminal 10c of the proxy user indicated by the switching image. In the example in FIG. 15, if terminal orientation information that instructs to change the terminal orientation to the left (or the right) is transmitted, switching instruction acceptance unit 306 accepts the terminal orientation information as a switching instruction that instructs to switch to the video that is to be clipped out of the video captured by proxy user's terminal 10c of proxy user β (or proxy user γ).

Although the switching images in the example in FIG. 15 have the shapes of arrows directed to the left and the right, a switching image may have the shape of a diagonal arrow as illustrated in the example in FIG. 10. In the example in FIG. 14, if virtual sight direction B3 is defined as the forward direction, proxy user β is located forward of and to the left of proxy user α. Therefore, switching image F1 has the shape of an arrow that diagonally points to the top left of the screen. Thus, it is possible to more accurately indicate the directions of other proxies.

Upon accepting a switching instruction, switching instruction acceptance unit 306 supplies the terminal ID of switching destination proxy user's terminal 10c to video clipping unit 302. Video clipping unit 302 clips the specified area out of the video captured by proxy user's terminal 10c indicated by the supplied terminal ID. Thus, content that includes video captured by the switching destination proxy user is distributed.

Locations in which a plurality of proxies capture video may be different locations in the same tourist spot. (e.g. a location near the entrance, a location in the center, and a location near the exit of a park) or locations in different tourist spots. In any case, a participant can specify video that he/she wishes to view from a wide range of video compared to when there is only one proxy user. Note that the method for switching to video captured by another proxy user is not limited to this method.

For example, content generation unit 304 generates content in which the voices of other participants, who are viewing video captured by proxies, come from directions in which the proxies are present. In the example in FIG. 14, content generation unit 304 generates content in which the voice of a participant viewing video captured by proxy user β comes from the front left, and the voice of a participant viewing video captured by proxy user γ comes from the rear right. In this case, as in the embodiment, participant's terminal 20 of participant A may be orientated toward the direction from which a voice comes, and thus switching to video captured by another proxy user located in that direction may be carried out.

2-7. Narrowing Down Other Participants (Part 2)

Other participants may be narrowed down based on video captured by which proxy user's terminal 10c, among the plurality of aforementioned proxy user's terminals 10c, is to be displayed. For example, content distribution unit 307 determines participant's terminal 20 that is displaying video captured by proxy user's terminal 10c that is the same as proxy user's terminal 10c that has captured the video displayed by switching source participant's terminal 20, as switching destination participant's terminal 20, and distributes content thereto.

In this case, specified range acquisition unit 303 supplies the terminal ID indicating participant's terminal 20 that has transmitted the range information indicating the same terminal ID to content generation unit 304 and switching instruction acceptance unit 306. Content generation unit 304 generates, as content that is to be distributed to participant's terminal 20, content that includes a voice recorded by participant's terminal 20 that is displaying video captured by proxy user's terminal 10c that is the same as proxy user's terminal 10c that has captured the video displayed by the aforementioned participant's terminal 20.

As a result, a participant can only hear the voices of participants who are viewing the video captured by the same proxy user as the proxy user of the participant. Thus, participants whose voices can be heard are narrowed down. Therefore, switching instruction acceptance unit 306 accepts a switching instruction upon receiving terminal orientation information indicating that the orientation of participant's terminal 20 is to be changed to the direction from which the voices of the participants thus narrowed down come from.

According to the present variation, content that is to be distributed to a participant can be switched only to content that is to be distributed to other participants who are viewing video captured by the same proxy user as the proxy user of the participant. Note that the participants are not necessarily narrowed down to those who are viewing video captured by the same proxy user, and may be narrowed down to those who are viewing video captured by proxies located near each other. In the present variation, the functions realized by proxy user's terminal 10c illustrated in FIG. 13 are used. In the present variation, position information acquired by source data acquisition unit 301 is information indicating a position where the video indicated by the acquired source data was captured.

This position information is an example of "capture position information", and source data acquisition unit 301 that captured the position information is an example of "a capture position acquisition unit". Content generation unit 304 generates, as content that is to be distributed to participant's terminal 20, content that includes a voice recorded by participant's terminal 20 that is displaying video captured by proxy user's terminals 10c from which position information indicating a position at a distance within a predetermined range to proxy user's terminal 10c that has captured video displayed by the aforementioned participant's terminal 20 (including proxy user's terminal 10c that has captured video displayed by the aforementioned participant's terminal 20).

For example, participant A is viewing video captured by proxy user α, participant B is viewing video captured by proxy user β, and participant C is viewing video captured by proxy user γ. It is also assumed that proxies α and β are capturing video in the same park (the distance between them is within the predetermined range), and proxy user γ is capturing video in another town (the distance to proxy user α is out of the predetermined range).

In such a case, content generation unit 304 generates, as content that is to be distributed to participant's terminal 20 of participant A, content that includes the voice recorded by participant's terminal 20 of participant B that is displaying video captured by proxy user's terminal 10c of proxy user β, but does not include the voice recorded by participant's terminal 20 of participant C. As a result, participant A can only hear the voice of participant B who is viewing the video captured by the proxy user who is at a distance within the predetermined ranged to the proxy user who has captured the video that participant A is viewing.

As a result of the above-described content data being transmitted, when there is a proxy user's terminal 10c from which position information indicating a position that is at a distance within the predetermined range to proxy user's terminal 10c that has captured video that is displayed by switching source participant's terminal 20 has been acquired, content distribution unit 307 determines participant's terminal 20 that is displaying the video captured by that proxy user's terminal 10c as switching destination participant's terminal 20, and distributes content. As a result, content that is to be distributed to participants can be switched only to content that is to be distributed to participants who are viewing video captured by proxies who are located at a distance within a predetermined range to the proxy user (including the proxy user himself/herself) who captured the video that is being viewed by the aforementioned participant.

2-8. Still Image Capturing

Although images displayed on participant's terminal 20 are moving images, a favorite picture may be captured and stored as a still image.

Figure 16:
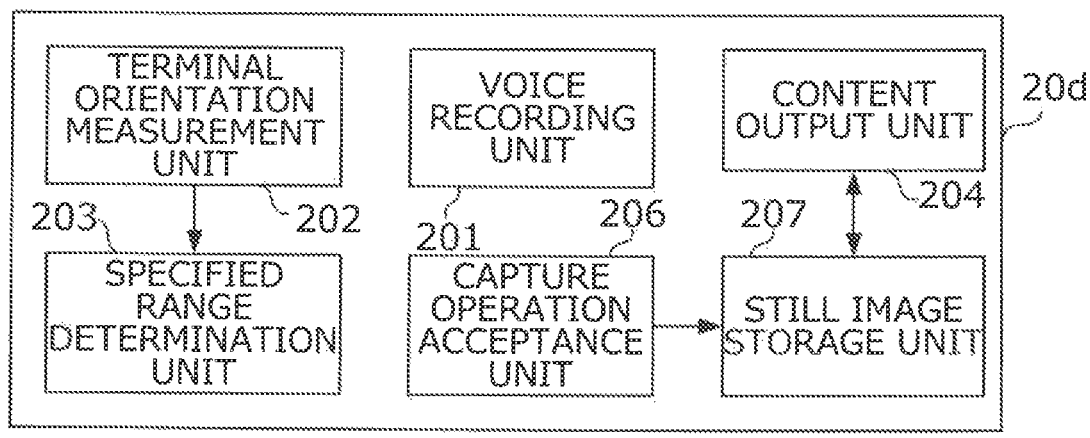
FIG. 16 is a diagram illustrating a functional configuration realized by a participant's terminal according to a variation.

FIG. 16 illustrates a functional configuration realized by participant's terminal 20d according to the present variation. Participant's terminal 20d includes capture operation acceptance unit 206 and still image storage unit 207 in addition to the units illustrated in FIG. 5.

Capture operation acceptance unit 206 accepts a capture operation performed by a participant. Capture operation is an operation to capture an image like a picture from video that is being displayed. A capture operation may be performed using input unit 25, or performed through a predetermined gesture represented by terminal orientation information. Upon accepting a capture operation, capture operation acceptance unit 206 notifies the acceptance of still image storage unit 207.

Upon being notified of the acceptance of the capture operation, still image storage unit 207 captures an image from the content output from content output unit 204, and stores the image as a still image. In this way, a participant can capture a scene that they like at a travel destination, and store and enjoy an image of that scene in the same way they would a photograph.

2-9. Participant's Terminal

In the embodiment, a head mounted display is used as a participant's terminal. However, a participant's terminal is not limited to a head mounted display. For example, a smartphone, a tablet terminal, a personal computer, or the like may be used as a participant's terminal. That is to say, any apparatus that can output distributed content (that can at least display video) may be used as a participant's terminal.

2-10. Apparatuses that Realize Units

Apparatuses that realize the functions illustrated in FIG. 5 and so on are not limited to the apparatus illustrated in the figures. For example, specified range determination unit 203 included in participant's terminal 20 may be realized by distribution server apparatus 30. Also, although switching instruction acceptance unit 306 accepts both a switching instruction and a return instruction, these instructions may be accepted by separate functions. In addition, the functions of distribution server apparatus 30 may be separately realized by two or more apparatuses. That is to say, the virtual travel system may include any number of apparatuses as long as the functions can be realized in the virtual travel system overall.

2-11. System

Although above each example describes a system for providing a virtual travel service (a virtual travel system), the present invention is applicable to another system. For example, the present invention may be applied to a system for virtually viewing musical performance, a sports game, an art exhibition, and so on. Also, the present invention may be applied to a system that distributes content that includes video captured by a robot or a drone. That is to say, the present invention may be applied to any system as long as it allows each of a plurality of users to view a range of video specified by the user out of large video such as 360-degree video or a plurality of pieces of video.

2-12. Categories of the Invention

The present invention may be understood as information processing apparatuses such as the proxy user's terminals, the participant's terminals, and the distribution server apparatus, as well as an information processing system, such as the virtual travel system that includes these apparatuses. The present invention can also be understood as an information processing method for implementing the processing executed by the respective apparatuses, as well as a program for causing a computer that controls the respective apparatuses to function. The program may be provided by being stored in a recording medium such as an optical disk or the like, or may be provided by being downloaded to a computer over a network such as the Internet and being installed so as to be usable on that computer.

2-13. Processing Sequences, Etc.

The processing sequences, procedures, flowcharts, and the like of the embodiments described in the specification may be carried out in different orders as long as doing so does not create conflict. For example, the methods described in the specification present the elements of a variety of steps in an exemplary order, and the order is not limited to the specific order presented here.

2-14. Handling of Input/Output Information, Etc.

Information and the like that has been input/output may be saved in a specific location (e.g., memory), or may be managed using a management table. The information and the like that has been input/output can be overwritten, updated, or added to. Information and the like that has been output may be deleted. Information and the like that has been input may be transmitted to other apparatuses.

2-15. Software

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and so on.

Additionally, software, commands, and so on may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, these hardwired technologies and/or wireless technologies are included in the definition of "transmission medium".

2-16. Information and Signals

The information, signals, and so on described in the specification may be realized using any of a variety of different techniques. For example, data, instructions, commands, information, signals, bits, symbols, chips, and so on that may be referred to throughout all of the foregoing descriptions may be realized by voltages, currents, electromagnetic waves, magnetic fields or magnetic particles, photo fields or photons, or any desired combination thereof 2-17. Systems and Networks The terms "system" and "network" used in the specification can be used interchangeably.

2-18. Meaning of "Based on"

The phrase "based on" used in the specification does not mean "based only on" unless specifically mentioned. In other words, the phrase "based on" means both "based only on" and "based at least on".

2-19. "And" and "Or"

In the specification, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-20. Variations, Etc. on Embodiments

The embodiments described in the specification may be used alone, may be combined, or may be switched according to how the invention is to be carried out. Additionally, notifications of predetermined information (e.g., a notification that "X is true") are not limited to explicit notifications, and may be carried out implicitly (e.g., the notification of the predetermined information is not carried out).

Although the foregoing has described the present invention in detail, it will be clear to one skilled in the art that the present invention is not intended to be limited to the embodiments described in the specification. The present invention may be carried out in modified and altered forms without departing from the essential spirit and scope of the present invention set forth in the appended scope of patent claims. As such, the descriptions in the specification are provided for descriptive purposes only, and are not intended to limit the present invention in any way.

REFERENCE SIGNS LIST

1 . . . Virtual travel system, 10 . . . Proxy user's terminal, 20 . . . Participant's terminal, 30 . . . Distribution server apparatus, 101 . . . Video capturing unit, 102 . . . Ambient sound recording unit, 103 . . . Camera orientation measurement unit, 104 . . . Capture data transmission unit, 105 . . . Terminal position measurement unit, 201 . . . Voice recording unit, 202 . . . Terminal orientation measurement, 203 . . . Specified range determination unit, 204 . . . Content output unit, 205 . . . Terminal information transmission unit, 206 . . . Capture operation acceptance unit, 207 . . . Still image storage unit, 301 . . . Source data acquisition unit, 302 . . . Video clipping unit, 303 . . . Specified range acquisition unit, 304 . . . Content generation unit, 305 . . . Content data transmission unit, 306 . . . Switching instruction acceptance unit, 307 . . . Content distribution unit, 308 . . . Content accumulation unit, 309 . . . Terminal information acquisition unit

What is claimed is:

1. An information processing apparatus comprising:
an image acquisition unit that acquires a captured image; and
a distribution unit that, upon receiving a range of image specified in association with a first display apparatus of a first user, clips a first partial image out of the captured image, in the range from the acquired captured image and distributes the clipped first partial image to the first display apparatus, and upon a display switching instruction being made in association with the first display apparatus, distributes a second partial image clipped out of the captured image in a range specified in association with a second display apparatus of a second user, to the first display apparatus; and
a transmission unit that transmits data indicative of a direction corresponding to the second display apparatus, to the first display apparatus;
wherein the first display apparatus includes an output unit that outputs the direction indicated by the data in a manner that allows the first user to discern the direction, wherein the distribution unit distributes, in response to an instruction to change an orientation of the first display apparatus to the direction corresponding to the second display apparatus, the second partial image clipped in a range specified in association with the second display apparatus, to the first display apparatus.

2. The information processing apparatus according to claim 1, further comprising:
an accumulation unit that accumulates the acquired captured image including the second partial image clipped in the past according to the range specified in association with the second display apparatus;
wherein the distribution unit distributes the second partial image clipped in the past, from the accumulated image, to the first display apparatus.

3. The information processing apparatus according to claim 1, further comprising:
a sound acquisition unit configured to acquire a sound that reaches the second display apparatus by acquiring voice data transmitted from the second display apparatus; and
wherein the transmission unit that transmits voice data that indicates a direction corresponding to the second display apparatus, and the acquired sound, to the first display apparatus; and
wherein the first display apparatus includes a speaker that outputs configured to output the sound indicated by the voice data transmitted by the transmission unit, as sound that comes from the direction indicated by the voice data; and
upon an instruction being made to change an orientation of the first display apparatus to the direction indicated by the voice data transmitted to the first display apparatus, the distribution unit distributes the second partial image clipped according to the range specified in association with the second display apparatus, to the first display apparatus.

4. The information processing apparatus according to claim 1, wherein:
the transmission unit that transmits a direction instructing image that indicates a direction corresponding to the second display apparatus, to the first display apparatus; and
when an instruction is made to change an orientation of the first display apparatus to the direction indicated by the direction instructing image thus transmitted, the distribution unit distributes the second partial image clipped according to the range specified in association with the second display apparatus, to the first display apparatus.

5. The information processing apparatus according to claim 1, further comprising:
a position acquisition unit that acquires position information indicating at least one position of one or more display apparatuses;
wherein the distribution unit determines another display apparatus from among the one or more display apparatuses, from which the position information indicating a position that is at a distance within a predetermined range to the first display apparatus has been acquired, as the second display apparatus to distribute the second partial image.

6. The information processing apparatus according to claim 1, further comprising:
a language acquisition unit that acquires language information indicating at least one language that is used in one or more display apparatuses;
wherein the distribution unit determines another display apparatus from among the one or more display apparatuses, from which the language information indicating a language that is the same as a language used in the first display apparatus has been acquired, as the second display apparatus to distribute the second partial image.

7. The information processing apparatus according to claim 1, further comprising:
a time zone acquisition unit that acquires time zone information indicating at least one standard time zone used at a position of one or more display apparatuses;
wherein the distribution unit determines another display apparatus from among the one or more display apparatuses, of which a standard time zone indicated by the time zone information acquired therefrom has a time difference smaller than a threshold value when compared to another standard time zone indicated by the time zone information acquired from the first display apparatus, as the second display apparatus to distribute the second partial image.

8. The information processing apparatus according to claim 1, further comprising:
a plurality of capturing apparatuses that capture images;
wherein the distribution unit determines another display apparatus that is displaying an image captured by a capturing apparatus that is the same as a capturing apparatus that has captured an image displayed by the first display apparatus, as the second display apparatus to distribute the second partial image.

9. The information processing apparatus according to claim 1, further comprising:
a plurality of capturing apparatuses that capture images; and
a capture position acquisition unit that acquires capture position information indicating positions of the plurality of capturing apparatuses;
wherein when the plurality of capturing apparatuses include another capturing apparatus from which the capture position information indicating a position at a distance within a predetermined range to a capturing apparatus that has captured image displayed by the first display apparatus has been acquired, the distribution unit determines another display apparatus that is displaying the image captured by the other capturing apparatus as the second display apparatus to distribute the second partial image.

* * * * *